United States Patent [19]

Rivers, Jr.

[11] Patent Number: 4,613,410

[45] Date of Patent: Sep. 23, 1986

[54] METHODS FOR DYNAMICALLY REFINING AND DEODORIZING FATS AND OILS

[76] Inventor: Jacob B. Rivers, Jr., 2801 NW. Expressway, Suite 125, Oklahoma City, Okla. 73112

[21] Appl. No.: 540,037

[22] Filed: Oct. 7, 1983

[51] Int. Cl.⁴ .................... B01D 1/16; B01D 3/10; C09F 5/12

[52] U.S. Cl. .................... 203/39; 203/72; 203/79; 203/80; 203/89; 203/90; 203/91; 203/100; 202/236; 260/428; 426/476; 426/478; 426/488; 426/492; 159/3

[58] Field of Search .......... 203/89, 90, 29, 72, 203/79, 71, 73, 80, 99, 100, 91, 14, 92, 93, 95-97, 87, 39; 426/487, 488, 492, 471-478; 260/428; 202/236, 205, 185 R, 186; 159/DIG. 40, DIG. 26, 1 A, 3; 549/413, 408

[56] References Cited

U.S. PATENT DOCUMENTS

| | | | |
|---|---|---|---|
| 1,954,371 | 4/1934 | Tarte et al. | 202/185.1 |
| 2,136,774 | 11/1938 | Hickman . | |
| 2,349,269 | 5/1944 | Hickman | 549/413 |
| 2,447,746 | 8/1949 | Ferris et al. | 203/89 |
| 2,483,623 | 10/1949 | Clayton | 260/428 |
| 2,500,934 | 3/1950 | Dean . | |
| 2,514,944 | 7/1950 | Ferris et al. | 203/89 |
| 2,527,602 | 10/1950 | Wall | 549/413 |
| 2,696,465 | 12/1954 | Kittredge | 202/236 |
| 2,803,589 | 8/1957 | Thomas | 202/236 |
| 2,991,298 | 7/1961 | Raffaeta | 203/90 |
| 3,102,062 | 8/1963 | Graham et al. | 159/3 |
| 3,226,306 | 12/1965 | Hausner | 202/185.5 |
| 3,326,779 | 6/1966 | Rodgers | 203/90 |
| 3,385,768 | 5/1968 | Yost | 202/236 |
| 3,457,142 | 7/1969 | Starmer | 202/185.1 |
| 3,481,529 | 12/1969 | Mugele | 159/DIG. 40 |
| 3,495,648 | 2/1970 | Amadon | 203/100 |
| 3,496,071 | 2/1970 | Spence | 202/236 |
| 3,503,854 | 3/1970 | Good | 202/236 |
| 3,607,670 | 9/1971 | King | 260/428 |
| 4,089,880 | 5/1978 | Sullivan . | |
| 4,154,750 | 5/1979 | Moore et al. | 260/428 |
| 4,200,497 | 4/1980 | Rhodes | 203/90 |
| 4,394,221 | 7/1983 | Stage et al. | 260/428 |

*Primary Examiner*—Wilbur Bascomb
*Attorney, Agent, or Firm*—Laney, Dougherty, Hessin, Claro & Beavers

[57] ABSTRACT

A method and apparatus for distilling, especially vacuum refining and deodorizing edible oils and fats utilizing sheets of oil driven downwardly in a distiller with a vacuum source at its top. A nozzle includes pressure equalization chambers, cantilever adjustment screws, and a central drag sheet to produce longer lasting and more uniform thin oil sheets to be driven in the distiller. A continuous process deaerates, dehydrates, degums, bleaches, refines, removes tocopherol, deodorizes, and strips peroxides and hydroperoxides from raw oil in a series of isothermal stages utilizing driven sheet distillers. No stripping steam is used except in the stage which strips peroxides and hydroperoxides. The method produces valuable, pure products such as tocopherol and fractionated fatty acids. It is especially efficient in heat exchange and low in waste and pollution producing products. A steam sparging nozzle for distributing steam in the stripping of peroxides and hydroperoxides includes a plurality of small tubes with openings which restrict steam flow so as to produce a uniform distribution of optimum size steam bubbles in the steam stripping column of oil. A microwave excitation device radiates the oil immediately prior to forming the driven sheets to excite the more volatile components of the oil for distilling.

11 Claims, 24 Drawing Figures

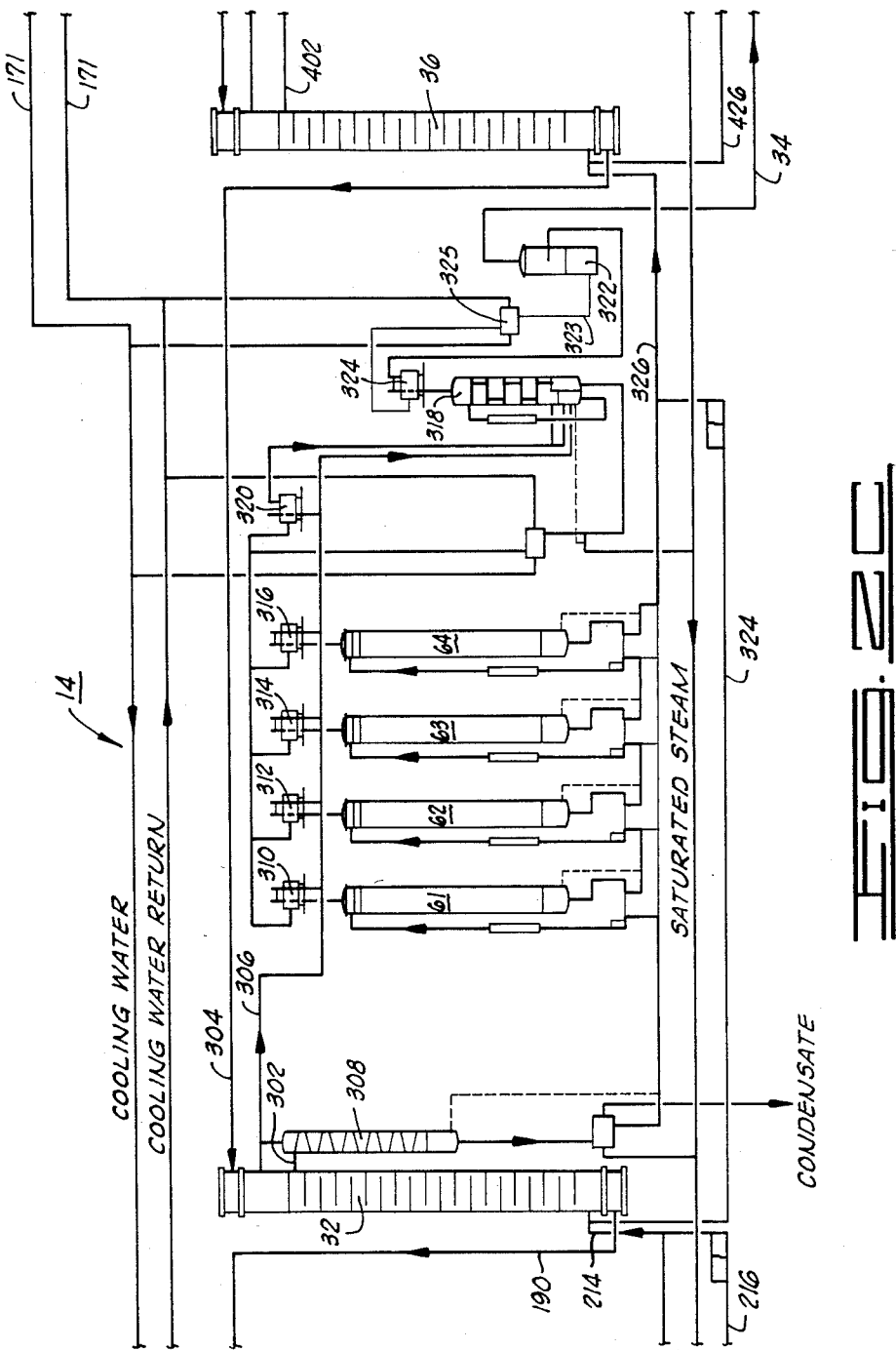

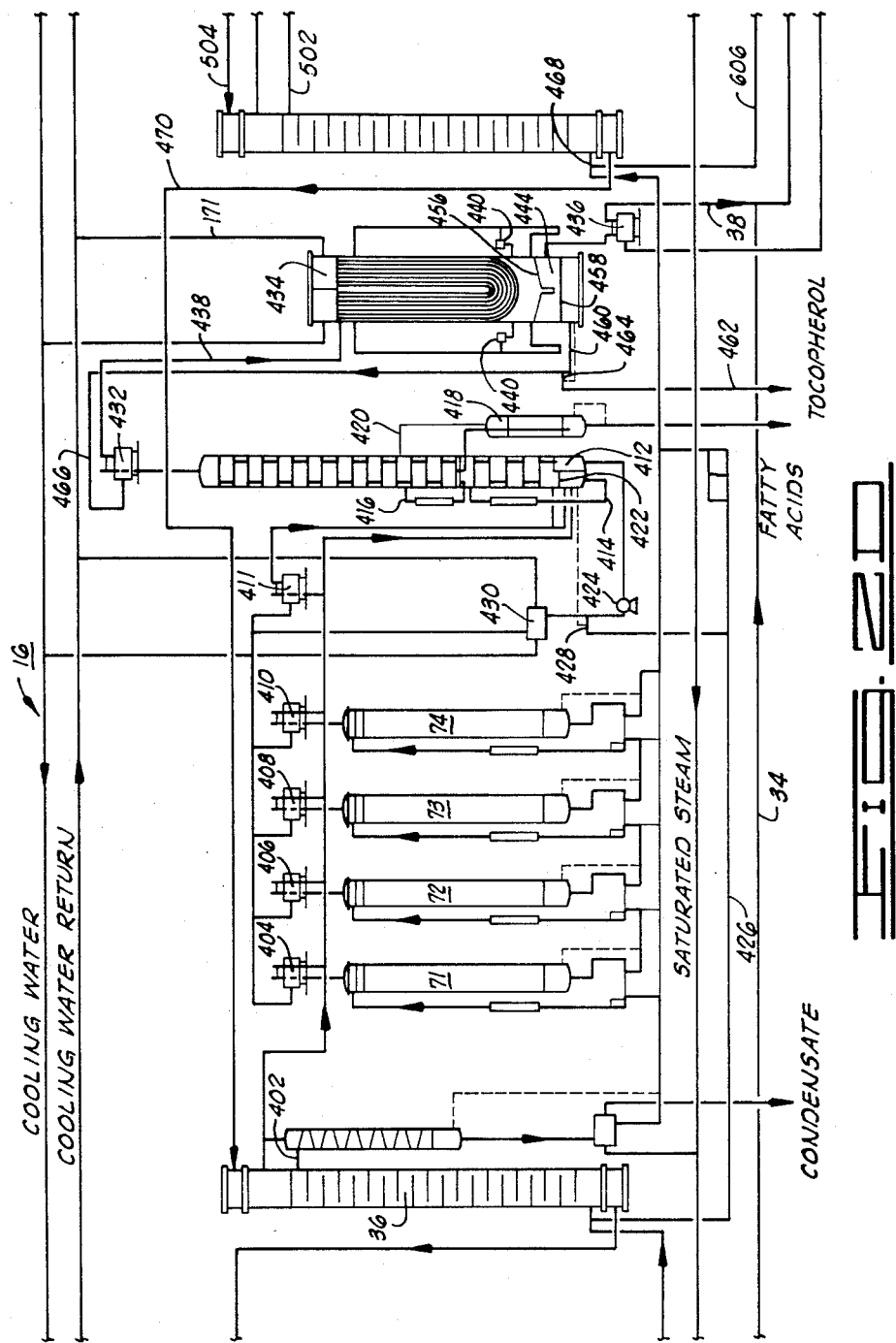

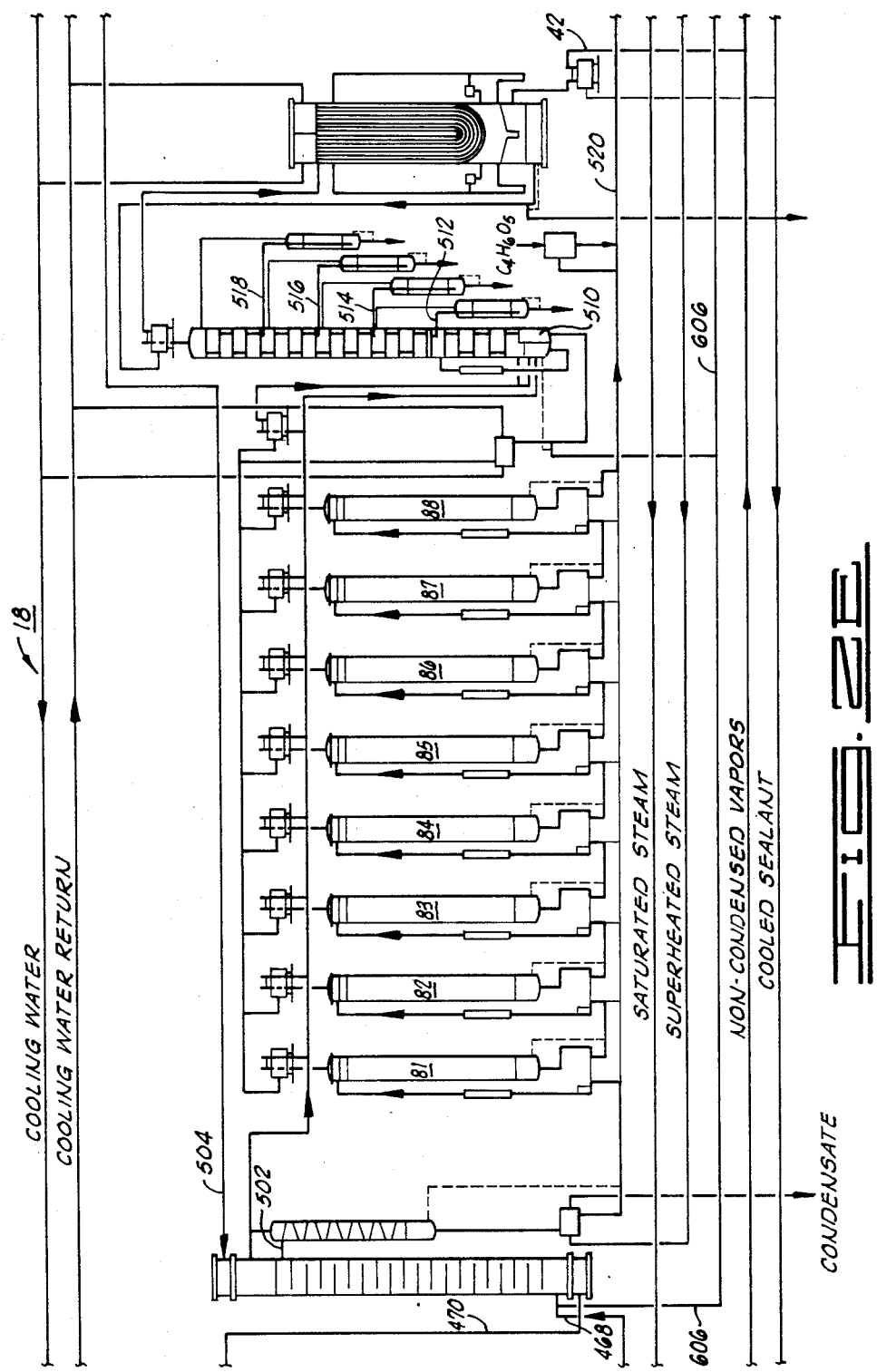

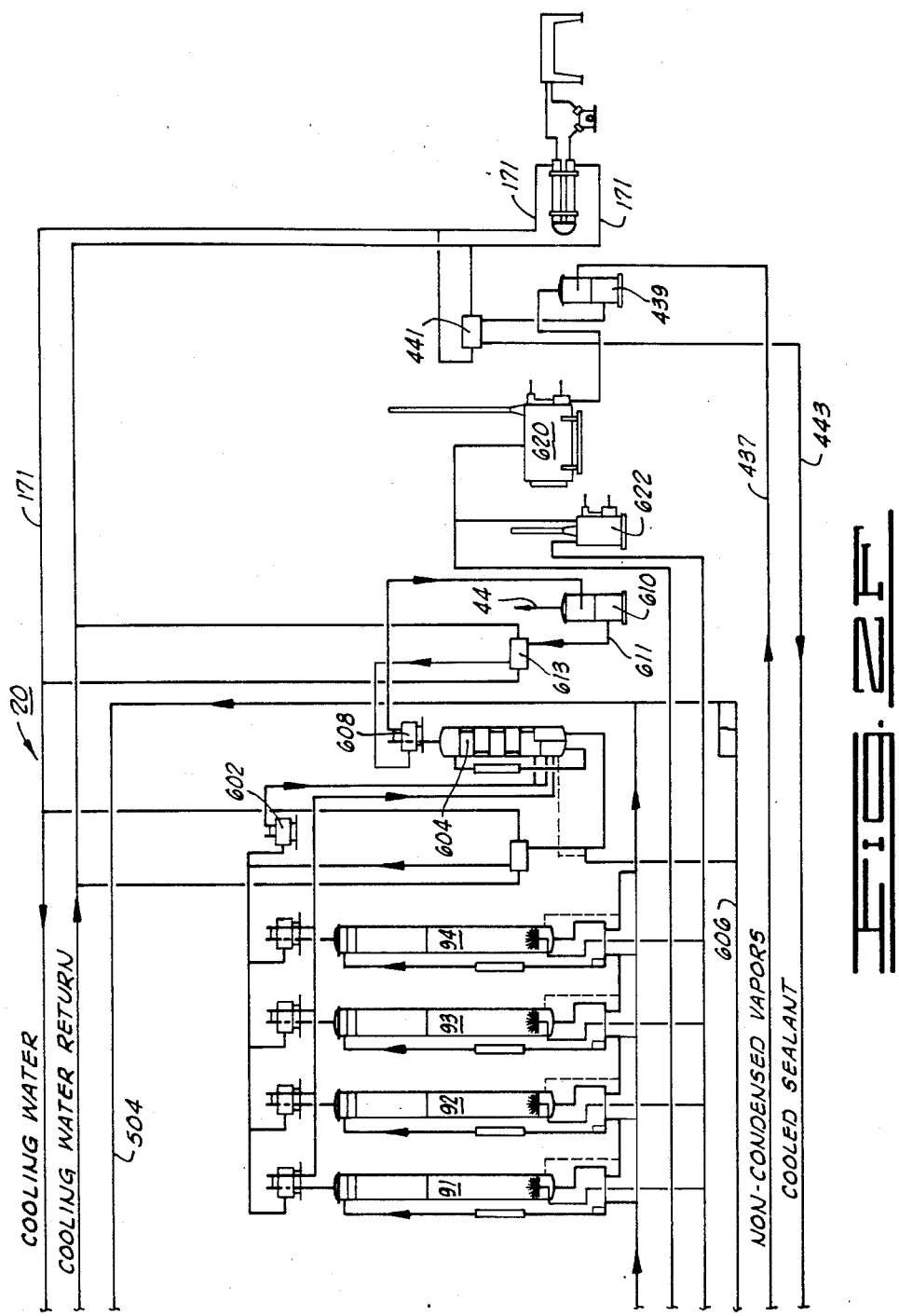

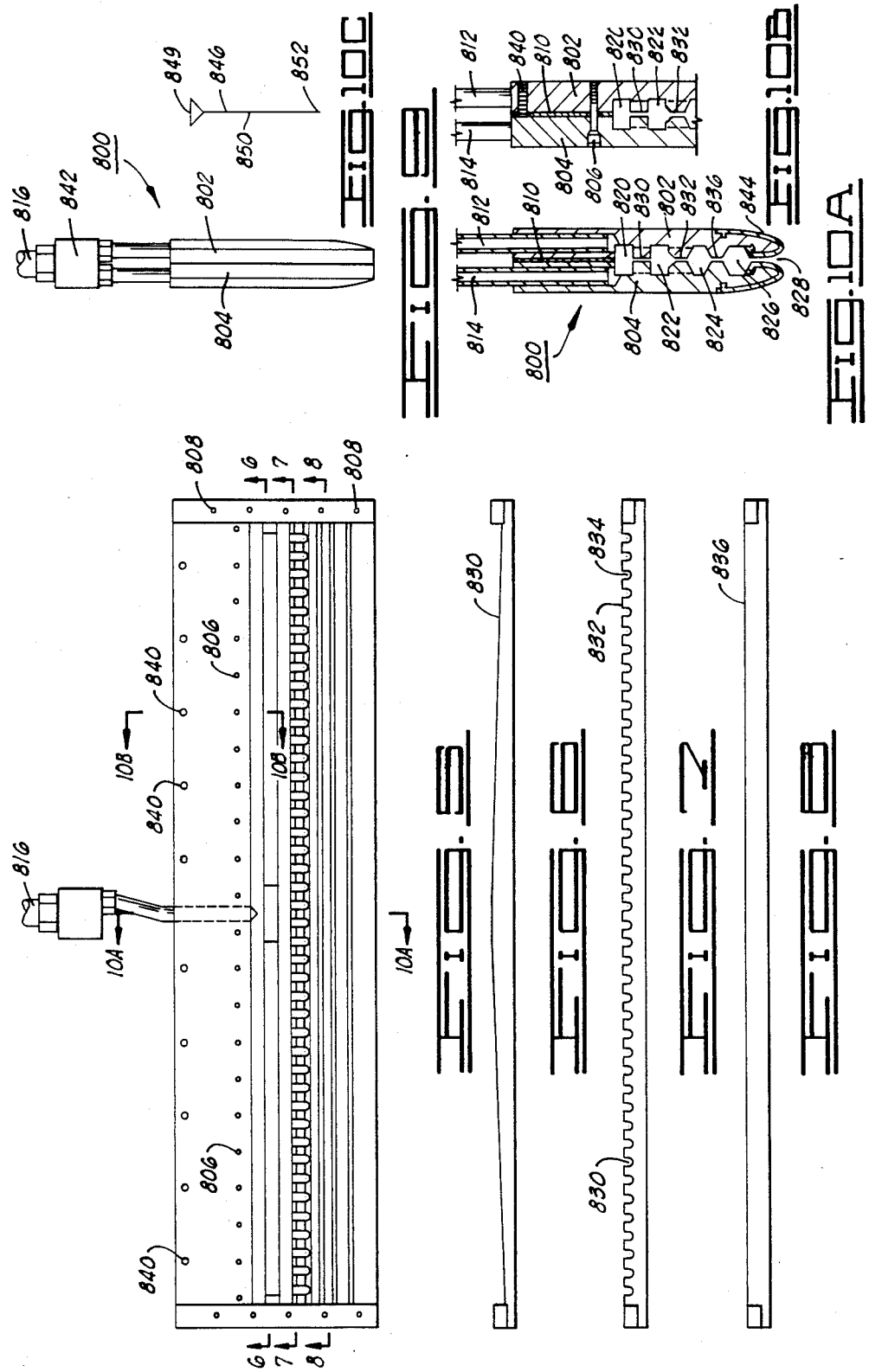

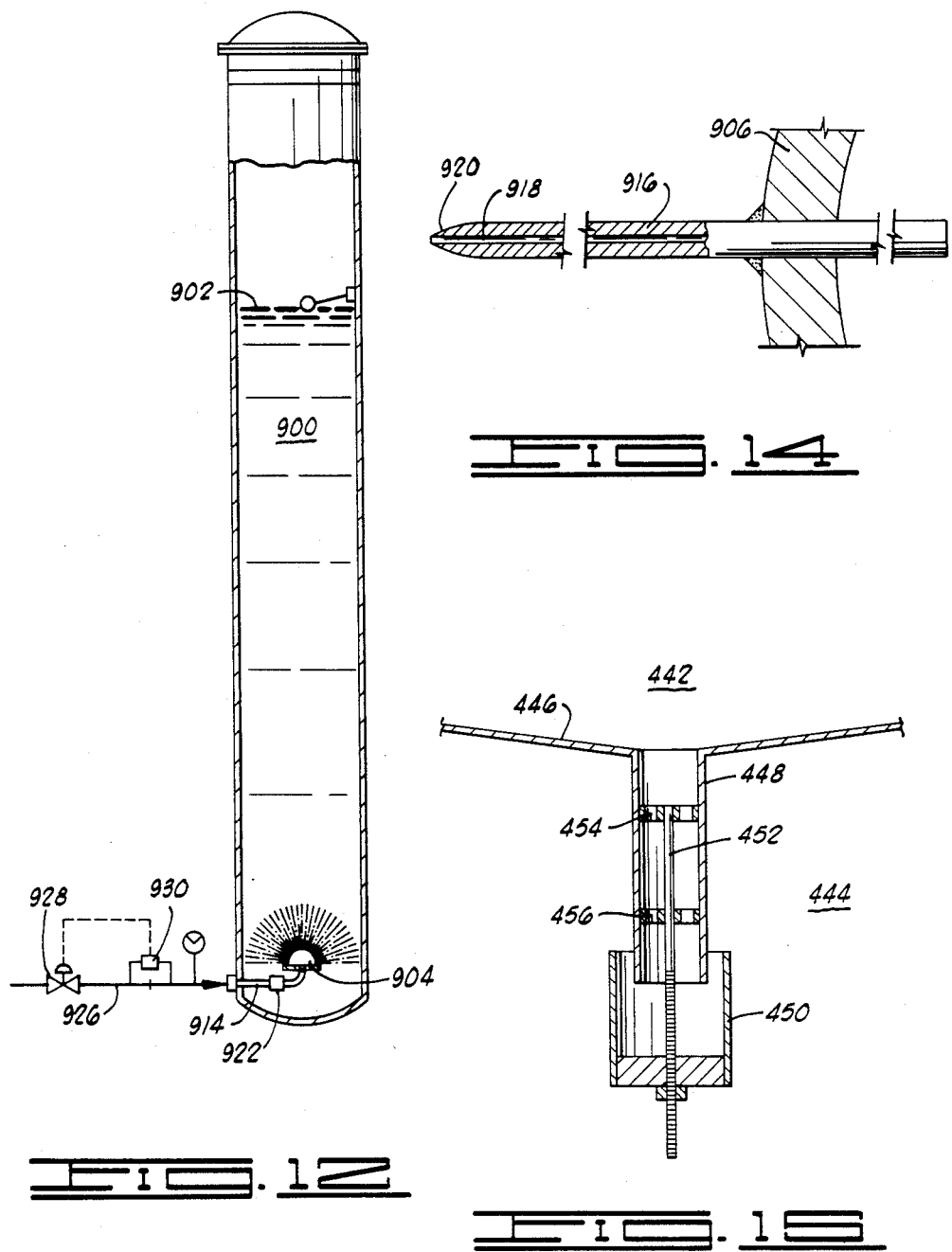

METHODS FOR DYNAMICALLY REFINING AND DEODORIZING FATS AND OILS

BACKGOUND OF THE INVENTION

1. Field of the Invention

This invention relates in general to methods and apparatus for refining and deodorizing edible oils and fats and particularly to methods and apparatus for continuous vacuum refining and deodorizing of fats and oils.

2. Description of the Prior Art

In the process of refining either vegetable or animal fats and oils to prepare foods such as margarine and cooking oils, several processes are presently available. Generally, these processes utilize vacuum distillation to remove odoriferous substances such as free fatty acids from the oils and fats comprising mainly triglycerides. By this means, the oils and fats are made more palatable and their odors and tastes are improved.

While the odoriferous and taste giving materials are more volatile than the oils in which they are found, the oils and fats may not be subjected to relatively high temperatures since undesirable polymerization or production of additional fatty acids, alcohols, aldehydes, etc., from the fats and oils occur at higher temperatures. Accordingly, the preferred method of deodorizing fats and oils has been by means of a vacuum distillation allowing a lower temperature removal of these more volatile odoriferous substances. Most of these vacuum processes use a stripping agent such as steam to increase the surface area of liquid oil and fat, to provide a carrying medium for removal of the volatile substances and to react with and strip certain undesirable components. In vacuum steam stripping, the oils are contacted by steam percolating upwardly in columns or trays of oil at elevated temperatures and subatmospheric pressures.

Many prior art processes of deodorization are discontinuous; i.e. the processes are performed in discrete stages, each completed before the next stage begins. For example, a batch of oil might be degummed and deaerated, then stored before further refining and deodorizing. Oils and fats may also be blended after refining and storage to be subsequently deodorized as a single product.

The first step of the prior art is the removal of water soluble phosphatides, or more particularly, lecithins. The process is known as degumming. The oil is washed with a mixture of water and acid, usually phosphoric, citric or malic (the water and acid is approximately 4% of the weight of the oil) in blenders, high speed mixers and subsequently centrifuged, discharging the phosphatides with the water. As the stability of the oil has been protected by the presence of the lecithins, the oil should be immediately deaerated and dehydrated through contact equipment operating at approximately 150° F. to 175° F. at reduced pressures.

Another step of the prior art is bleaching. Bleaching is the removal of undesirable color from the oil, generally by the use of clays capable of absorbing the color ingredients upon its surface. The mixture of oil and clay is then separated in pressure filters leaving the oil free of the objectionable color. This step is usually performed separately from the other steps.

Following degumming, deaeration, dehydration and bleaching the oil is refined and deodorized. If the oil is a normal vegetable oil, not cotton seed oil, and has not been abused in extraction, transportation or storage, it will contain, at this point, approximately 0.5% removable hydrocarbons with the balance being pure triglycerides. Not accounting for trace materials, the 0.5% will contain about 85% free fatty acids and 15% tocopherol.

Two methods of refining are commonly used: caustic and steam. Caustic refining reacts the free fatty acids with caustic, saponifying the free fatty acid for removal. Steam refining recognizes that most of the free fatty acids are subject to normal distillation and the method uses steam to spring and carry the distillates from the oil. Because of temperature constraints, the latter method must be vacuum stripping and distillation.

For batch type deodorization, the equipment most frequently used for steam stripping deodorization of edible oils, not including deaeration, has been a singular column with a singular vacuum source placed on top of the column. The most common vacuum system is a multiple effect or staged steam eductor system. Oil is retained in the column or recycled through the column while stripping steam is bubbled up through the column for stripping free fatty acids or other odoriferous materials from the oil. The overhead from the column is a mixture of eductor steam, stripping steam, tocopherol, free fatty acids and small amounts of other materials. Processing continues until the desired or economical amount of deodorization has been achieved.

In addition to the separate batch process steps of refining the prior art also includes a semi-continuous deodorization process in which several functions are performed within a singular column. Heating and cooling as well as selective distillation and steam stripping are accomplished concurrently between several trays (really tanks because of their size) within a common column. Present practices frequently allow the oil product to become reaerated after degumming or caustic refining and likewise deaeration procedures are frequently not carried to completion. Hence, subsequent deaeration is performed within the semi-continuous deodorization process. The process holds all stages (large trays) for a particular "batch time" although the "batch time" is not as long as for the batch type deodorization process. Often, less pure oil is produced because a more pure product would require a much longer residence.

In both the batch and semi-continuous processes, the prior art has attempted to decrease the absolute pressure within the column in order to reduce the residence of the oil in the columns. Large amounts of energy are expended to accomplish the low pressure in order to reduce the residence and in order to make the volatile materials spring from the oil more quickly.

Present practice also over-heats the oil all too frequently. In the past, the high temperatures of the column are obtained promptly by Dowtherm ™ heat exchangers. Exceedingly high skin temperatures of the oil are created in these heat exchangers prior to the oil entering the columns in order to hurry the deodorization to completion. It is well recognized that the longer the oil is subjected to higher temperatures, the more the oil breaks down to produce additional odoriferous materials which must also be removed from the oil. Of course, greater energy use to obtain higher vacuum, higher temperatures or shorter residence reduces the profitability of the process. If longer residence times are permitted, the increase in labor and the decrease in availability of the equipment also reduces profitability.

As can be seen, the prior art methods have several disadvantages. One significant disadvantage is the energy inefficiency of these processes. In order to increase the throughput of the equipment, more and more horsepower has been utilized to increase the vacuum within the steam stripping chambers. As the current practice is not truly continuous, true product to product heat transfer cannot approach its ultimate efficiency as heat transfer is a function of time. Eductor steam has the disadvantage of not yielding its full energy into the production of the low pressure as all of its energy cannot be used in producing dynamic work upon the vapors to be removed. In other words, the eductor steam cannot expend its enthalpy energy upon the system.

Another significant disadvantage of the prior art has been that the methods utilized create environmental problems due to the manner in which the volatile materials are discarded. For deodorization, the quantity of eductor steam plus the stripping steam may equal the mass of the oil being deodorized. Since all the vapors are co-mingled with the steam flow, the total heat lost over head from the liquid oil is extravagant. Likewise, this mixture of hydrocarbon vapor and water vapor present a separation problem with a great deal of the hydrocarbon, when condensed, being sent to local sanitary facilities as this effluent is not acceptable for stream discharge. The BOD of the hydrocarbon water mixture is extremely high with most municipalities making surcharges. Desirable materials are discarded with the eductor and stripping steam which could be marketable if they were to remain uncontaminated. For example, tocopherol is frequently discarded along with fatty acids and water.

SUMMARY OF THE INVENTION

It is accordingly an object of the present invention to provide an improved method and apparatus for dynamically refining and deodorizing fats and oils.

Another object of the present invention is to provide an improved method and apparatus for deodorizing fats and oils in a more efficient manner which is truly continuous.

Still another object of the present invention is to provide an improved distillation chamber and method of distillation in a chamber for use in refining and deodorizing edible oils and fats.

Still another object of the present invention is to provide a method and apparatus for refining and deodorizing edible oils and fats in an efficient manner which concurrently fractionates the distilled vapors into desirable by-products.

Still another object of the present invention is to provide an energy efficient and environmentally superior method for refining and deodorizing edible fats and oils.

Yet another object is to provide an improved distillation process which adds excitation energy for refining edible oils and fats without overheating or damaging the oil.

Yet another object is to provide an improved steam distributor and steam distributor column for use in the steam stripping of edible oils.

Yet another object is to provide an improved method for continously condensing low volume vapors produced in refining edible oils and fats.

In accordance with these objects, the present invention utilizes a distillation chamber having a means for driving a plurality of relatively thin sheets of oil having a relatively large surface area downwardly in parallel in the chamber. A vacuum producing device is provided at the top of the chamber, preferably a liquid ring vacuum pump. By this configuration, the vacuum is applied to a greater surface of oil and, moreover, it is applied in a manner which more efficiently springs the distillation vapors from the oil. The oil can be supplied to the chamber at a temperature appropriate for distillation at the pressure of the chamber. Preferably, the chamber includes a means for heating the oil to precisely the proper distillation temperature.

A plurality of chamber nozzles to produce and properly form the driven sheets are disposed at the top of the distillation chamber. Each nozzle is preferably configured so as to drive the thin sheets of oil downwardly at a high velocity while the sheet maintains its integrity for as far down in the column as possible. The nozzle must, therefore, produce a sheet which is uniform in thickness both horizontally and vertically. The nozzle of the present invention comprises an elongated body having central liquid inlet on its upper edge and an elongated liquid outlet on its lower edge defined by first and second lips. A pressure equalization means communicates the inlet and outlet and equalizes the liquid pressure longitudinally across the outlet. An adjustment means is provided for adjusting the shape of a sheet of liquid driven from the nozzle.

The pressure equalization means of the nozzle preferably comprises first, second, third and fourth nozzle chambers connected by first, second and third longitudinal slots, respectively. The inlet of the nozzle is connected to a central portion of the first nozzle chamber. The first slot connects the first and second nozzle chambers and tapers from a relatively narrow central portion to a relatively wide end portion so as to evenly longitudinally distribute the greater central liquid pressure in the first nozzle chamber to the second nozzle chamber. The second slot connects the second and third nozzle chambers and has a plurality of uniform, evenly spaced, vertical openings disposed longitudinally across the slot for pressure equalization. The third slot connects the third and fourth nozzle chambers and has a relatively uniform width for longitudinal pressure equalization. A central drag plate can be provided through the chambers and slots to equalize drag on the oil sheet allowing the oil sheet to be driven further prior to its breakup.

The adjustment means of the nozzle preferably comprises a plurality of threaded screws longitudinally spaced along the body member to exert a cantilever pressure through the body member urging a portion of the first and second lips of the nozzle outlet to narrow or widen upon threaded adjustment of each of said plurality of said adjustment screws.

To allow selective excitation of the to-be-vaporized components, the distillation chamber of the present invention preferably includes a microwave transmission device disposed for transmission of microwaves into the oil as it enters the top of the distillation chamber. The microwave transmission selectively excites the volatile components to promote vaporization.

The method of distillation utilized by the present invention comprises forming a thin sheet of oil having a relatively large surface area and driving this sheet of oil in a distillation chamber at distillation temperature and pressure such that a distillation vapor product is formed therefrom and such that the surface of the sheet of oil moves rapidly with respect to the distillation vapor product so as to promote further distillation.

Preferably, a plurality of parallel, closely spaced, thin, liquid oil sheets are formed and driven downwardly at a relatively high velocity in the distillation chamber. A vacuum source at the top of the distillation chamber causes the distillation vapors to move rapidly upwardly between the sheets of oil. This method increases the speed of vaporization by increasing the liquid surface to which an effective vacuum is supplied, by decreasing the static pressure directly adjacent to the liquid surface, by increasing the relative velocity pressure between the vapor and liquid, and by reducing or eliminating the fluid film at the oil surface which normally inhibits vaporization. The method likewise decreases the distance through the liquid body through which the distillates must travel before being liberated at the liquid surface.

Preferably the vacuum source at the top of the distillation chamber is a pump which does not introduce steam into the distillation vapors. A liquid ring pump sealed by oil or fat from the process is preferred.

In the deaeration, dehydration and distillation of all hydrocarbons, the present invention does not utilize stripping steam. This improves vaporization since the steam itself inhibits vaporization by increasing the pressure at the liquid surface and by increasing the volume of vapors to be removed from the chamber. The present invention likewise does not utilize eductor steam to create vacuum in the system. Such eductor steam puts undue mass burdens upon the vacuum effects subsequent to the primary vacuum device which vitiates the effectiveness of all vacuum systems.

The method of the present invention provides a continuous process replacing the batch and semi-continuous processes of the prior art and producing desirable discrete products not produced by the prior art. In connection with the distillation of edible oils and fats, the vapor products produced by the present invention can include water, air, tocopherol, fatty acids, alcohols, ketones, aldehydes and other materials. Such products are in a relatively pure state since the present invention uses no eductor steam and extracts the vapor products without the aid of stripping steam.

The method of the present invention is especially useful for distillation of free fatty acids from triglycerides since it provides a fast and efficient distillation which reduces the number of free fatty acids formed as a result of degradation of triglycerides during deodorization. The method of the present invention allows use of lower heat exchanger skin temperatures while still providing an extremely short residence.

The method of the present invention provides for a series of isothermal stations for the distillation of the raw oil in stages. Each station has a relatively constant temperature established by the leaving (finished oil) flow exchanging its heat to the entering (unfinished oil) flow. In the continuous condition of operation, only trimming heat is added at each isothermal station plus individual heat trimming at each of the distillation chambers, as is needed, to compensate for heat losses as the liquid moves through the distillation chambers. A sufficient number of the distillation chambers are used in series within an isothermal station so that distillation goes to completion, if desired.

Preferably, the method includes a completely continuous distillation process with separate isothermal stages for deaeration and dehydration, bleaching low temperature refining, tocopherol distillation, high temperature refining, and steam stripping of peroxides and hydroperoxides. Except for bleaching, each such stage includes at least one distillation chamber utilizing the driven sheet distillation method of the present invention. Separate stages or equipment within stages can be provided for degumming and bleaching for a totally continuous, complete refining and deodorizing system.

The method also preferably includes a unique vapor system. Vacuum devices which do not add mass to the system, such as liquid ring vacuum pumps, are used instead of steam eductors of the prior art to provide vacuum to the distillers. This maintains a low vapor pressure and more efficient vacuum in the vapor recovery system. It also allows direct condensation of desirable products such as tocopherol, fatty acids, etc. Staging of the liquid ring pumps, use of the countervelocities in the distillation chambers and condensation of the vapors greatly improve the efficiency of applying vacuum to the liquid for distillation.

As an example of an isothermal station of the type used with the continuous process of the present invention, the tocopherol distillation station will now be described. Prior to this staall aldehydes, alcohols, etc. have been removed from the unfinished oil or fat so that the next volatile component, tocopherol, remains in solution in the oil and fat, but no components with a lower boiling temperature remain. As the oil or fat is moved into and heated to the temperature of the next isothermal station, only hydrocarbons at or above the boiling temperature of tocopherol will go overhead. The overhead vapors are conveyed to a rectifying column which produces virtually pure tocopherol. The tocopherol is separated as a pure product suitable for sale as is. The liquid ring vacuum pump above the rectifying column is sealed with the liquid phase tocopherol product as any other sealant would contaminate the pure tocopherol produced. The production of tocopherol in this isothermal station occurs continuously as all other processes, such as removal of free fatty acids, also are continuously proceeding.

This process can be continuous with low residence time due to the efficiency of distillation produced by the driven sheet method of distillation. This driven sheet method provides a large surface area subjected to both low pressure and to high velocity distillation vapors moving upwardly in the distillation chambers. Accordingly, no single station is a constant limiting factor in the complete refining and deodorization.

In order to provide efficient condensation of the low volume, low flow, tocopherol the present invention circulates the distilled tocopherol vapor through a condenser having separated upper and lower sections. Vapor in the upper section is continuously recirculated over condensing coils at a rate sufficient to produce turbulent flow for good heat transfer. Liquid condensing in the upper section moves through a liquid seal to the lower section where a level control pump can remove product tocopherol from the process.

Although all other isothermal stations of the method of the present invention do not use steam, a final subsection does utilize stripping steam but not eductor steam. This final subsection is provided to remove peroxides and hydroperoxides. This steam stripping subsection is supplied with super-heated steam to eliminate thermal shock upon the oil which occurs by the use of saturated steam at almost any practical pressure. This procedure eliminates the hazards of overheating the oil or fat (to compensate for the heat loss) at its highest temperature. The subsection includes driven-sheet distillation chambers in series similar to those previously described. However, the level of liquid in the columns is higher than in the other columns to allow more contact with the stripping steam.

Preferably, the stripping chamber has disposed at its lower end beneath the normal liquid level a special distribution device (for distribution of super-heated steam evenly throughout the liquid in the stripping chamber) which maximizes the ratio between the surface area of the steam to its mass for the purpose of rapid reaction with the peroxides and hydroperoxides. The distribution device includes a plurality of relatively small tubes connected to a distribution body having a distribution chamber therein. The tubes have narrow interior passages which limit the flow of gas therethrough for production of optimal bubble size in the liquid. This sub-section of the final isothermal station has its own vapor recovery system which operates independently of the balance of the isothermal station.

For a further understanding of the invention and for further objects, features and advantages thereof, reference may now be had to the drawings taken in conjunction with the following description of preferred embodiments.

BRIEF DESCRIPTION OF THE DRAWINGS

FIGS. 2A-2F show a more detailed schematic view of the process of FIG. 1.

FIG. 5 is a side view of a portion of a distillation column nozzle constructed in accordance with the present invention.

FIG. 6 is a cross-sectional view of the portion of a nozzle shown in FIG. 5 taken along the lines shown in FIG. 5.

FIG. 7 is a cross-sectional view of the portion of a nozzle shown in FIG. 5 taken along the lines shown in FIG. 5.

FIG. 8 is a cross-sectional view of the portion of a nozzle shown in FIG. 5 taken along the lines shown in FIG. 5.

FIG. 9 is an end view of a nozzle constructed in accordance with the present invention.

FIG. 10A is a cross-sectional view of the nozzle shown in FIG. 5 taken along the lines shown in FIG. 5.

FIG. 10B is a cross-sectional view of the nozzle shown in FIG. 5 taken along the lines shown in FIG. 5.

FIG. 10C is a cross-sectional view of a nozzle insert piece for the nozzle shown in FIG. 10A.

FIG. 12 is a schematic side view of a steam stripping column of the present invention.

FIG. 14 is a cross-sectional view of a tip of a tube of the steam distributor of FIG. 13.

FIG. 15 is a side cross-sectional view of a portion of a surface condenser of FIG. 2D.

FIG. 16 is an enlarged schematic view of a portion of the process shown in FIGS. 2A-2F.

DESCRIPTION OF PREFERRED EMBODIMENTS

Figure 1:
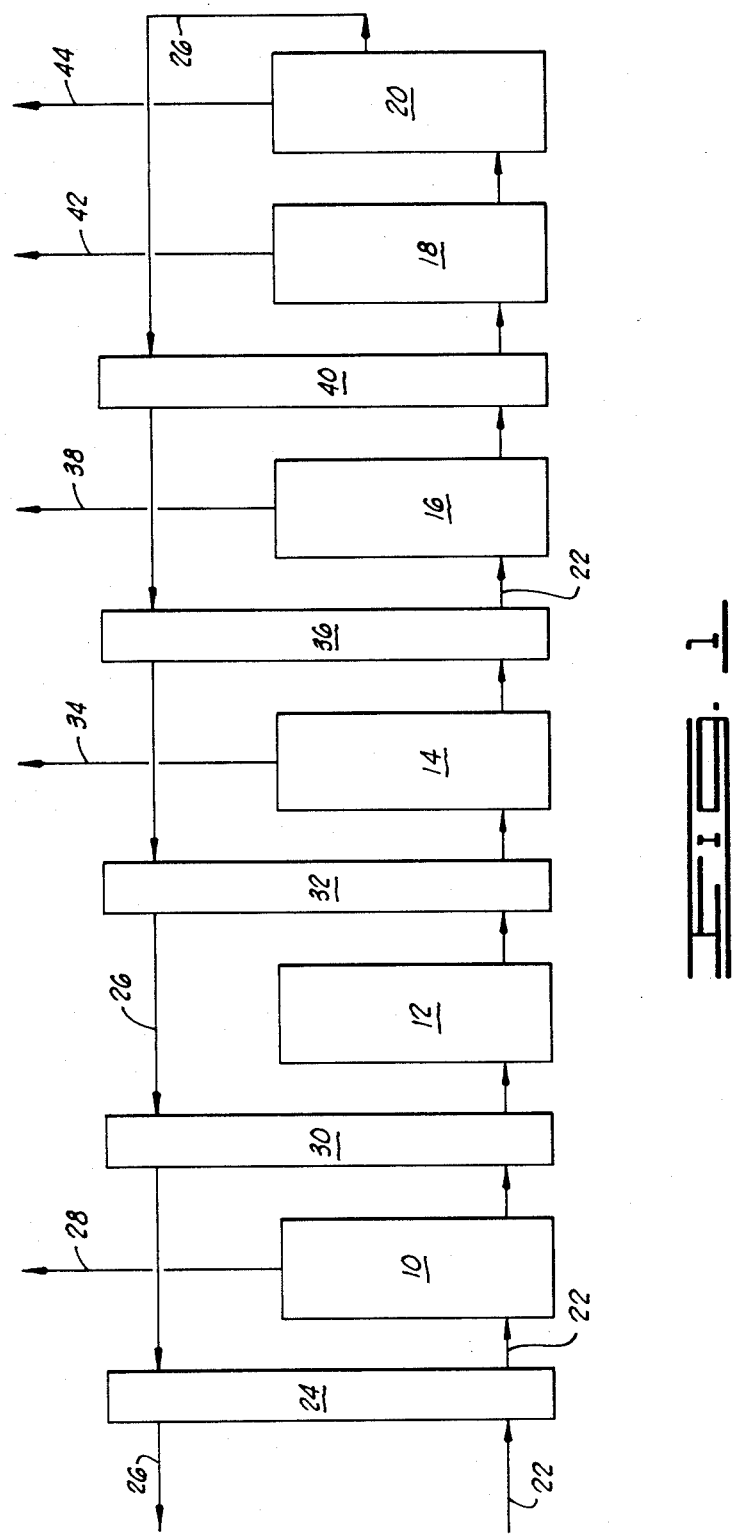
FIG. 1 shows a schematic view of a process of refining fats and oils in accordance with the present invention.
Figure 2A:
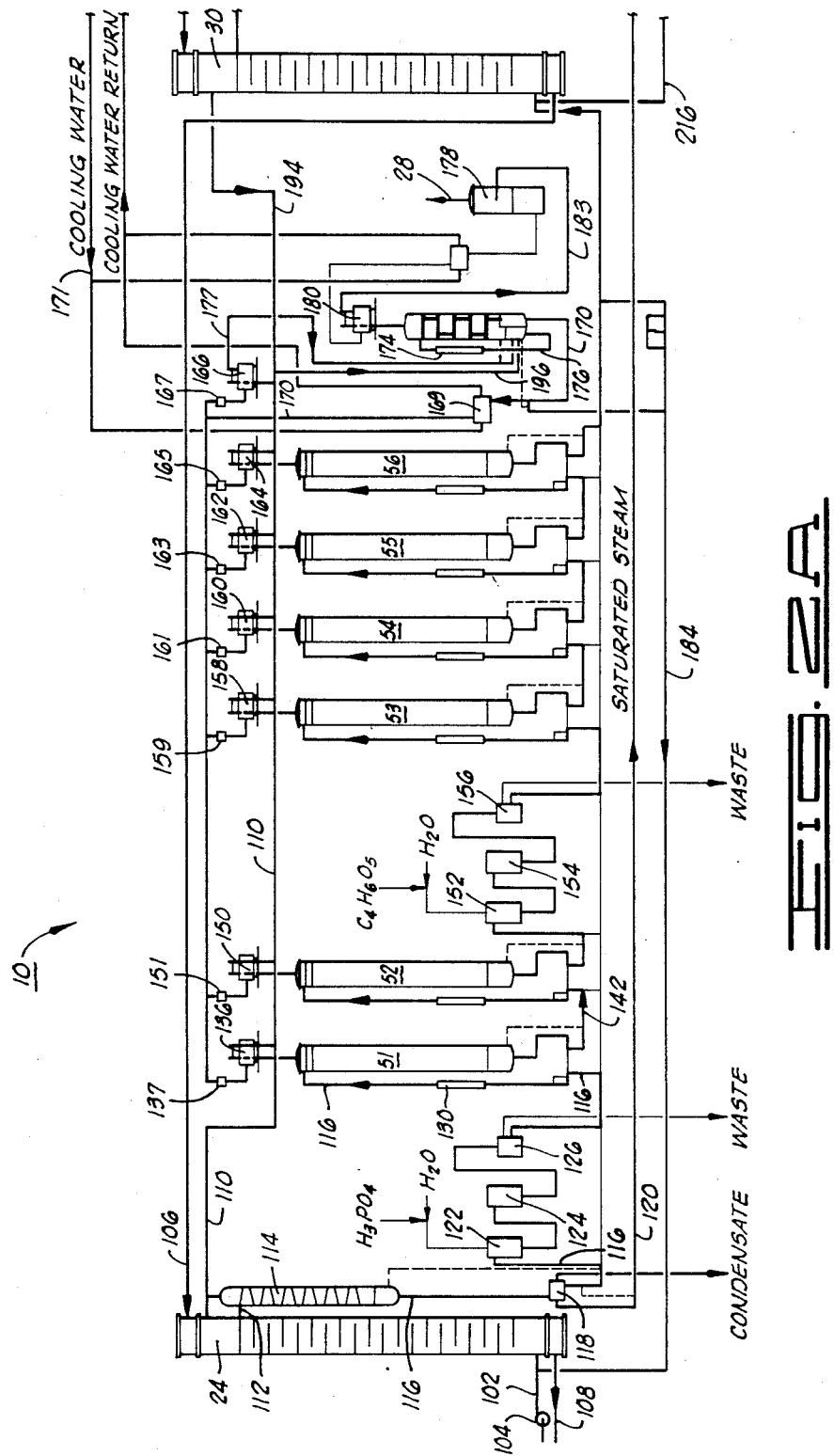
Figure 2B:
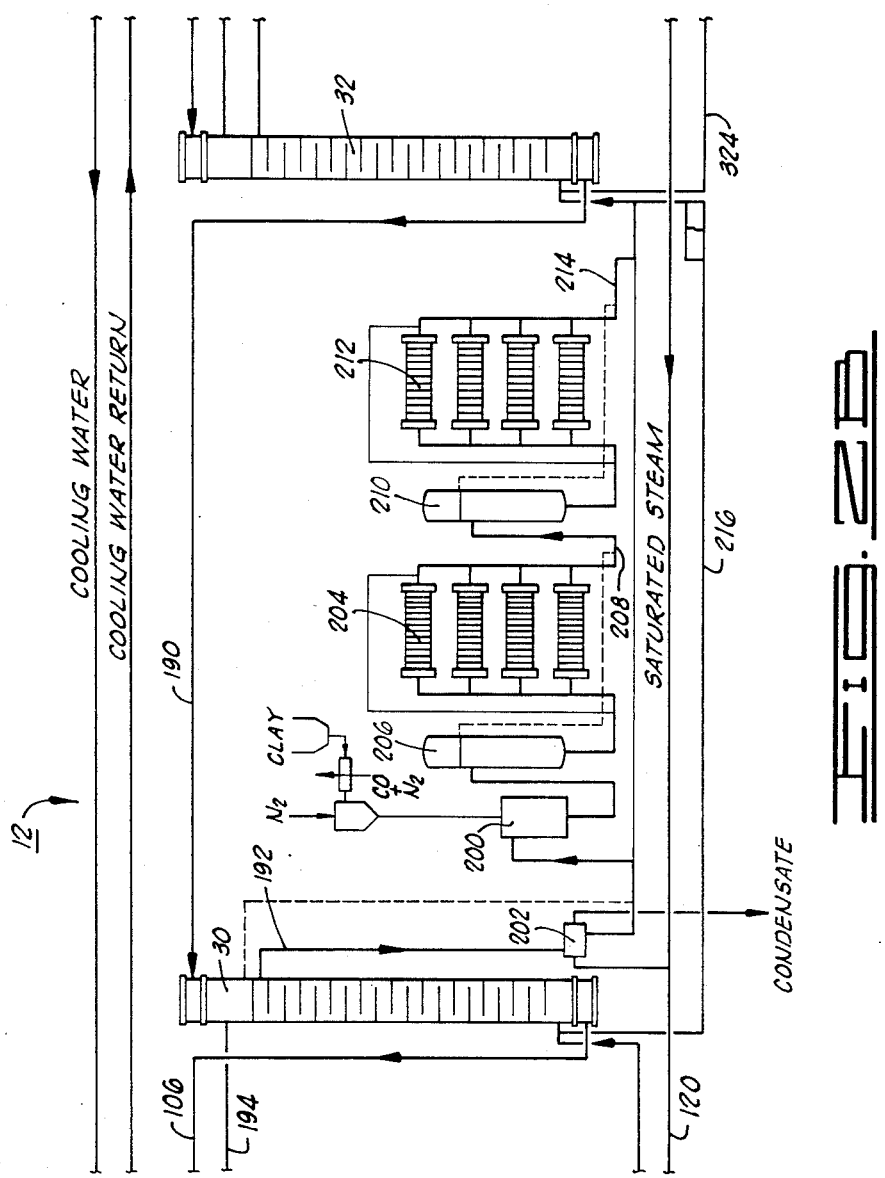

Referring now to FIG. 1 and FIGS. 2A-2F, the method and apparatus of the present invention are shown schematically. The present invention differs in its most dramatic respects from refining and deodorizing of edible oils and fats of the prior art in that the entire process is continuous, steam is used only in one portion, the distillation is more efficient and produces discreet and valuable products, and the process does not produce products which are difficult to dispose. As is apparent through an understanding of the present invention, most of these differences are made possible by the method and apparatus of distilling by driven sheets, disclosed below.

It is well known that evaporation and distillation are surface dependent. Thus, the more surface a liquid presents, the more evaporation will occur. Further, it is well known that evaporation is influenced by the vapor pressure and the vapor motion adjacent to the liquid surface. Thus, a lower vapor pressure produces a faster evaporation and a faster vapor motion adjacent to the liquid surface produces a faster evaporation. With respect to the vapor motion, the influence of vapor motion on evaporation rates increases as the vapor pressure above the liquid surface decreases. This is because one aspect of evaporation is convection of the evaporated molecules away from the liquid surface and convection proceeds faster with a faster vapor motion adjacent to the liquid surface.

It is also well known that liquids have a fluid film which acts as a barrier to vaporization (see, for example, Walker, Lewis and McAdams, Principles of Chemical Engineering, 1927, pages 40-42). The film is created by molecules vaporizing from the liquid surface with relatively low velocity. These low velocity molecules insulate the liquid surface. Movement away from the fluid film requires a force applied to the film and most distillation processes are relatively inefficient in applying this force.

In a fluid film produced by a liquid having multiple components, the film will contain both lighter, more volatile molecules and heavier, less volatile components. To move these molecules from the film a dynamic force must be applied and since dynamic force equals mass times acceleration, the force to move the heavier molecules is greater than the force to move the lighter molecules. Therefore, the lighter components will vaporize more rapidly and act as a barrier to the vaporization of the heavier components.

With respect to liquids having two or more components differing in their volatility still another factor becomes important to evaporation. This factor is the time for migration of the more volatile component molecules in the liquid to the liquid surface. Accordingly, the relative thickness of a liquid with two components affects the ability of that liquid to evaporate the more volatile component.

In a liquid such as raw vegetable oil, there are volatile components such as free fatty acids and tocopherol in less volatile triglycerides. In oil and fat refining and deodorizing, these triglycerides must remain below their degradation and polymerization temperatures. In this situation, it is not possible to simply heat the material to drive off the volatile components since the amount of time to drive off the volatile components at a temperature lower than a damage temperature is too long. Accordingly, the pressure is lowered to increase the rate of distillation at safe temperatures.

The prior art methods of low pressure distillation recognize that no matter how great the vacuum which is applied at the top of a column, it is difficult to apply that vacuum to a large surface area of material. The prior art may produce a static pressure near 0.5 mm Hg at the primary vacuum device, while at the actual surface where vaporization is taking place, the static pressure will be on the order of 50 mm Hg. This is due to the static pressure gradient between the vaporizing surface and the primary vacuum device caused by the presence of the vapors, both water from the stripping steam as well as the hydrocarbons themselves.

Likewise, for steam stripping it is assumed that effective distillation is taking place throughout a liquid body. This is simply not true as the static liquid pressure below an oil surface diminishes the desired vacuum by static liquid head of the oil above the point of distillation. Finally, the relative thickness of the liquid and migration of the volatile components to the surface of the liquid is a significant hinderance to distillation of the volatile components. Adding more trays reduces the liquid thickness but drastically increases the column size, reduces flow rates through the column and increases pressure drop through the column. Prior patents such as U.S. Pat. No. 2,280,896 to Dean recognize this problem.

The present invention avoids the problems of the prior art by providing a distillation chamber having a plurality of relatively narrow and elongated nozzles at the upper end thereof to drive relatively thin sheets of oil or fat downwardly in the chamber. These sheets are parallel to each other and closely spaced to improve the velocities of the vapor counterflow. The nozzles are precise to maintain the integrity of the sheets for as long as possible as they move downwardly in the chamber.

At the upper end of a chamber of the present invention, a vacuum source such as a liquid ring vacuum pump creates a relatively low pressure at the top of the column. Unlike the columns of the prior art, the amount of surface area directly affected by the vacuum source is much greater. More importantly, the distilled volatile materials which leave the liquid surface as the sheets are driven downwardly move rapidly upwardly toward the vacuum source at the top of the chamber as the diameter of the chamber is relatively small and the vapor sections between the driven sheets of oil or fat are narrow. Accordingly, there is a relatively high velocity between the sheets of liquid driven downwardly into the chamber and the volatile vapor products moving upwardly in the chamber. This relative motion assists in improving distillation due to the action of the vapor molecules on the liquid surface and those molecules adjacent the liquid surface.

Thus, the distillation of oil and fat provided by the present invention employs closely-spaced unsupported sheets of oil driven at high velocity through a vacuum chamber. The sheets of oil move downwardly at high velocity while the volatile vapors move upwardly at relatively high velocity. The static vapor pressure adjacent to the enlarged surface area is maintained relatively low due to the velocity energy above the liquid surfaces. The dynamic sheer between the vapor mass and the liquid mass encourages distillation by reducing or eliminating the insulating fluid film adjacent to the liquid surface. The relatively thin sheets of oil promote rapid vaporization of the more volatile components due to the relatively short distance through which volatile molecules must migrate to the liquid surface.

The present invention also utilizes a multiplicity of vacuum chambers in series for each of the distillations. In this way, not one but several vacuum sources can be applied to a distillating volatile product. This increases the surface area to which the vacuum source is applied and provides flexibility for oil having greater or lesser quantities of a particular distilled component.

The provision for a separate set of vacuum chambers for each distilled component provides a significant advantage over the prior art single chamber for all fractions since the separate fractions occur substantially one after another whether distilled in one chamber or many. In other words, substantially all of each of the volatile components must distill prior to the next component having a significant distillation rate. In a single column distillation of all volatiles, the distillation of the first volatiles hinders distillation of the second producing an undesirably long residence necessary for a desired refining and deodorization. The series of distillation chambers provided by the present invention for each component avoids this inefficiency.

Referring now to FIG. 1 and FIGS. 2A-2F, a complete refining and deodorizing process in accordance with the present invention is shown schematically. As shown, degumming, deaerating, dehydrating, bleaching, low temperature refining, tocopherol distillation, the fatty acid distillation, and steam stripping all occur simultaneously at five isothermal stations. At isothermal station 10, degumming, dehydration and deaeration occur at approximately 160° F. At isothermal station 12 bleaching occurs at approximately 230° F. At isothermal station 14 refining distillation to remove ketones, aldehydes and other components occurs at approximately 285° C. At isothermal station 16 tocopherol distillation occurs approximately 290° F. as measured at the top of the tocopherol rectifying column. At isothermal station 18 fatty acid distillation occurs at approximately 490° F. Finally at subsection 20 of isothermal station 18, steam stripping occurs to remove peroxides and hydroperoxides at approximately 490° F.

Between each of the stations having a different temperature and at the beginning of the process is a heat exchanger exchanging heat from the finished oil to the unfinished oil moving into the next station. In this manner, an efficient use of the heat applied to the oil is obtained. After startup, assuming a relatively well insulated set of equipment, relatively little heat is lost as waste heat. No significant amount of oil or fat product heating or cooling is required throughout the process.

Raw oil enters the process through stream 22. It exchanges heat within heat exchanger 24 with a stream 26 of finished oil or fat leaving the system. The unfinished but now heated oil in stream 22 then enters isothermal station 10 for degumming, dehydration, and deaeration. Water and air exit the isothermal station 10 at a stream 28. The unfinished but now degummed, deaerated, and dehydrated oil in stream 22 then exits isothermal station 10 and enters heat exchanger 30. At heat exchanger 30, the unfinished oil in stream 22 again exchanges heat with the product oil 26.

The unfinished oil in stream 22, after heat exchange in heat exchanger 30 then enters the isothermal station 12 for bleaching. Except for including bleaching and heat exchange as part of the continuous process of the present invention, the bleaching process used in isothermal station 12 is well known in the prior art.

Following bleaching the unfinished oil in stream 22 is conveyed to heat exchanger 32 where the unfinished oil again exchanges heat with the finished oil in stream 26. This further heated unfinished oil then enters isothermal station 14 for a relatively low temperature distillation for removing aldehydes, ketones, alcohols, and those components boiling at a temperature less than the temperature of removal of tocopherol. In other words, the separation in isothermal station 14 removes all components which are more volatile than tocopherol. The removed components exit in stream 34 and the unfinished oil, following the removal of these components continues in stream 22 to heat exchanger 36.

In heat exchanger 36 the unfinished oil again exchanges heat with finished oil raising its temperature for distillation of tocopherol in the isothermal station 16. The isothermal distillation in station 16 produces an essentially pure stream of tocopherol 38. This pure tocopherol is a very valuable product of the present invention and this product is not achieved in this manner by any of the prior art. Following removal of the tocopherol the unfinished oil from station 16 enters a heat exchanger 40.

Following a final heat exchange between unfinished oil and finished oil in heat exchanger 40, the unfinished oil enters an isothermal station 18 for distillation of free fatty acids. The free fatty acids exit the isothermal station 18 in stream 42. Preferably, the free fatty acids are then fractionated and condensed into the several free fatty acids fractions.

The unfinished oil from station 18 then enters the final subsection 20 of isothermal station 18. The subsection 20 is a part of isothermal station 18 although it performs the stripping function while the balance of isothermal station 18 does not. It is necessary to keep separate the steam vapor products found in the subsection 20 from the balance of isothermal station 18 so that free fatty acid products may be discretely recovered.

In subsection 20 of isothermal station 18, the unfinished oil is steam stripped to remove peroxides and hydroperoxides from the triglycerides. The water, peroxide and hydroperoxide vapors leave the subsection 20 by steam 44 and the finished oil leaves subsection 20 in stream 26.

Figure 17:
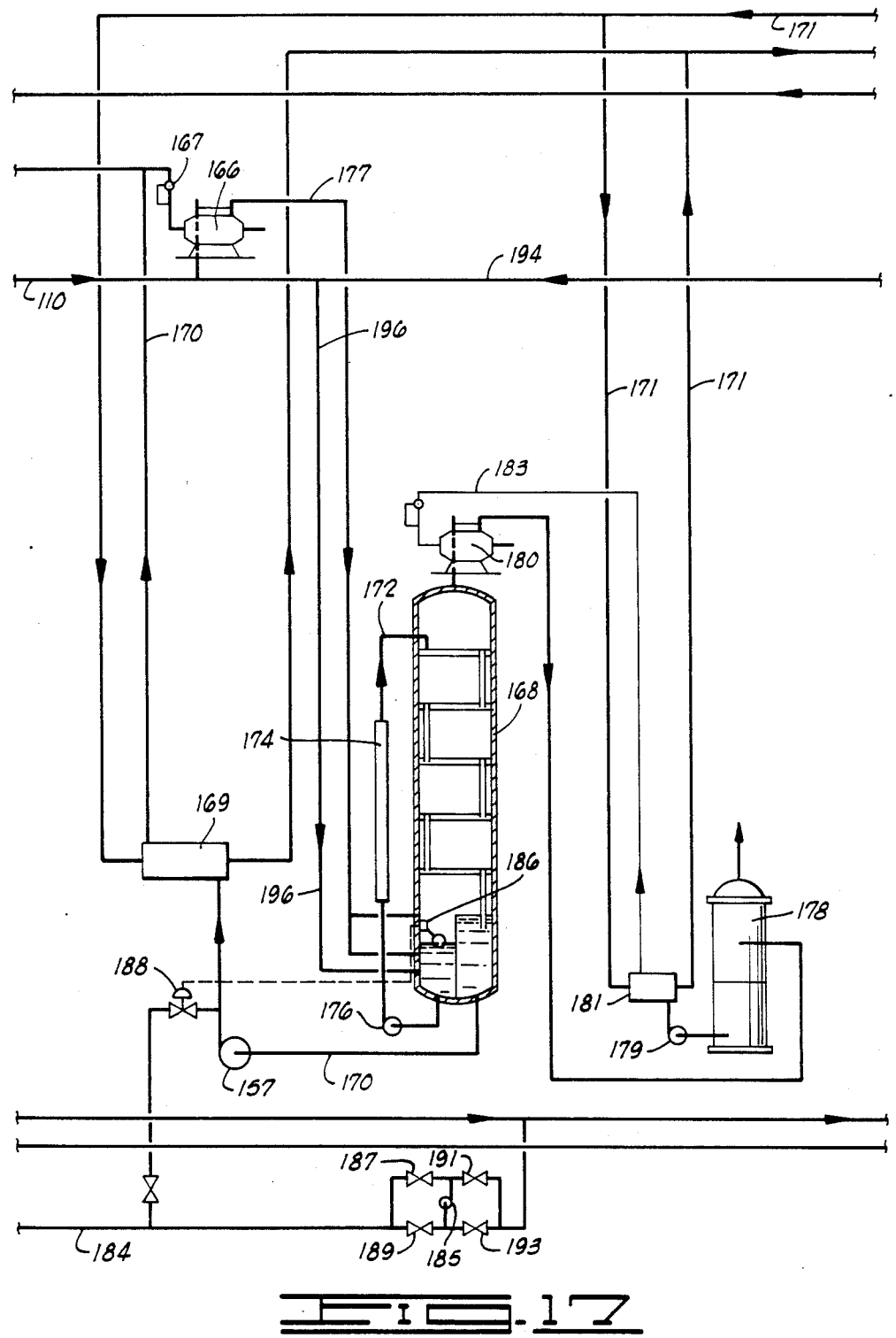
FIG. 17 is an enlarged schematic view of a portion of the process shown in FIGS. 2A-2F.

Referring to FIGS. 2A through 2F as well as FIGS. 16 and 17, an example continuous edible oil distillation process of the present invention is shown schematically in more detail. Heat exchangers 24, 30, 32, 36 and 40 are redundantly shown on appropriate pages of the drawings to aid in understanding the flow connections. Distillation chambers 51-56, 61∝64, 71-74, 81-88 and 91-94 are all vacuum distillation chambers utilizing driven sheets as described above. The chamber top and the nozzle construction and arrangement are shown in greater detail in FIGS. 3 through 11. The steam stripping column components which relate to the addition of steam are shown in greater detail in FIGS. 12 through 14.

Unfinished oil continuously enters the system through stream 102 driven by metering pump 104. An example of unfinished oil would be finely screened soybean oil. This unfinished oil would have about 0.4% free fatty acids and 0.1% tocopherol with the balance being essentially triglycerides. Other components such as phosphatides, chlorophyll, and dissolved oxygen are also present in small quantities. As the unfinished oil enters at stream 102 it typically has a temperature of approximately 70° F.

The unfinished oil in stream 102 enters a heat exchanger 24 where the unfinished oil exchanges heat with finished oil which enters the heat exchanger in stream 106 and exits the heat exchanger at stream 108. The finished oil in stream 106 typically has a temperature of 170° F. and stream 108 typically has a temperature of 80° F.

The unfinished oil which exits exchanger 24 exits in a vapor stream 110 and a liquid stream 112. The vapor stream 110 and the liquid stream 112 are both approximately 160° F. The liquid stream passes through a contactor 114 which allows additional vapor from the unfinished oil to enter stream 110. A liquid stream 116 exits the contactor 114. The liquid stream of unfinished oil which has been heated to approximately 160° F. enters a heat exchanger 118 which provides trim heat or start up heat to the oil prior to entering blender 122. Saturated steam is provided to heat exchanger 118 by means of stream 120.

Following heat exchange in heat exchanger 118, stream 116 of unfinished oil passes through a blender 122, a high speed mixer 124, and a centrifuge 126 for the addition and removal of phosphoric acid and water. This removes phosphatides and some water from the unfinished oil stream 116. This is the first stage of degumming.

The stream 116 is pumped by a pump 128 through a trim heater 130 prior to entering the top of vacuum distillation chamber 51. The trim heater 130 supplies small amounts of heat to the unfinished oil with steam or electrical energy or heat from a side stream of finished oil. After trim heating the stream 116 enters a microwave exciter 132 at the top of chamber 51. The microwave exciter 132 selectively excites the water and more volatile components of the unfinished oil compared to the triglycerides and less volatile components. Little heat is transferred into the unfinished oil by the microwave exciter as the exposure of the oil to it is extremely short. Nevertheless, the selective excitation of the more volatile components promotes distillation without harming the oil. The configuration of the microwave exciter with respect to the nozzles in the upper portion of the vacuum distillers is described in more detail below.

The pump 128 supplies constant pressure (this constant pressure is adjustable to allow proper sheet configuration of the oil) to the oil or fat in the nozzles in the top of chamber 51. This importantly allows each nozzle to produce a uniform, thin sheet of oil. A constant pressure valve 134 is provided in stream 116.

Providing vacuum to vacuum distillation chamber 51 is a liquid ring vacuum pump 136. The suction side of the pump is connected to the top of vacuum distillation chamber 51. The discharge of the pump 136 is into the vapor stream 110 which exits the heat exchanger 24.

At the bottom of chamber 51 is a level control 138. The effluent 142 at the bottom of chamber 51 has the static vapor pressure of the chamber itself plus the liquid head pressure of the height to the liquid surface. Hence, pump 144 is a magnetically driven pump with no shaft seals through which atmospheric air may leak into pump. Pump 144 pressures the unfinished oil to 35 to 50 pounds per square inch. Thus, mechanical seals are permissible for the higher pressure pumps (such as pump 128 and 143 and equivalent pumps on the remaining distillation chambers).

Likewise all valves in the liquid flow will have a pressure greater than atmospheric and, hence, will not allow air to contaminate the liquids passing therethrough. An orifice plate 145 is placed in stream 146 upstream from the check valve 148. Its purpose is to flow preferentially larger portions of the unfinished oil in the direction of the valve 140, thus requiring pump 128 to receive nearly all of its suction flow from the unnumbered flow 116 from the centrifuge 126. This arrangement together with the other flow controls and valves is capable of discharging the exact flow it receives from any component. When the entire apparatus is operating at full capacity, little flow passes through stream 146 or similar streams. In other words, this arrangement provides flow control through all components established by metering pump 104.

As is apparent from the drawings, each of the distillation chambers 51–56, 61–64, 71–74, 81–88 and 91–94 has similar apparatus for flowing oil in driven sheets, heating, level control, suction and reflux. Therefore, the apparatus descriptions for each of the remaining chambers will not be described since it is the same as that described for chambers 51 and 52.

The outlet stream 142 of unfinished oil from distillation chamber 51 enters a second distillation chamber 52 which is in series with distillation chamber 51. Together these distillation chambers provide a first dehydration and deaeration of the unfinished oil. A major portion of the water and dissolved oxygen are removed from the oil in chambers 51 and 52.

A liquid ring vacuum pump 150 provides vacuum to chamber 52. The liquid and vapor effluents from both vacuum pumps 136 and 150 is to the vapor stream 110. The stream consists of water vapor, air, unfinished oil used for liquid ring pump sealant and unfinished oil entrainment. In fact, a small amount of entrained oil is needed if the system is to operate at its highest efficiency. The driven sheets of oil must be driven at very high velocities in order to obtain the maximum benefit of the vaporizing efficiencies unique to this process. Such high velocities cause parts of the driven sheets of oil or fat to shear creating small particles to be entrained in the rising vapors.

Following dehydration and deaeration in chambers 51 and 52, the unfinished oil enters a blender 152, a high speed mixer 154, and a centrifuge 156 where malic acid and some water are added and removed. This further removes phosphatides from the unfinished oil. This second stage of degumming is more efficiently accomplished with the removal of water which was achieved in chambers 51 and 52.

Following the second stage degumming, unfinished oil then is conveyed through distillation chambers 52 through 56 in series for further deaeration and drying. The oil at this stage should be completely deaerated because of its vulnerability to auto-oxidation following degumming. Liquid ring pumps 158, 160, 162, and 164 supply vacuum to each of the distillation chambers 53, 54, 55 and 56 respectively, and exhaust water, oxygen, liquid ring pump sealant and entrained oil or fat to stream 110.

Referring especially to FIG. 17, the overhead vapors stream 110 which gathers the distilled vapors from chambers 51–56 enters the suction side of a liquid ring vacuum pump 166 which provides an improved effective vacuum to the chambers 51–56. The pump 166 drives a liquid and vapor stream 177 to a bubble-cap column 168. A vertical stream 196 which is a continuation of streams 110 and 194 carries the liquid phase materials which may condense or which are carried as entrainment in streams 110 and 194 to bubble-cap column 168. These liquids consist of any condensed vapors, unfinished oil entrainment having come out of entrainment and the liquid ring pump sealant of unfinished oil. The conduit through which stream 110 flows should be sloped to allow liquid which flows therein to move rapidly to vertical stream 196, preventing liquid from filling the conduit and from entering pump 166. Liquid from stream 196 must enter the column below a point where the pressure in stream 110 and the discharge pressure from vacuum pump 166 are balanced with the liquid head of the unfinished oil.

The bubble-cap column 168 separates less volatiles and the entrained oil (as much as 0.5% of the product flow is desirable) which enter stream 110 and a portion of this oil is supplied through stream 170 as a sealant to the liquid ring pumps 136, 150, 158, 160, 162, 164, and 166. The sealant oil to these pumps is moved by a pump 157 and is cooled by a cooler 169 fed by cooling water in stream 171.

Flow of sealant oil to the pumps 136, 150, 158, 160, 162, 164 and 166 is limited by constant flow valves 137, 151, 159, 161, 163, 165 and 167 adjacent each pump. This maintains the proper amount of sealant to each pump.

A recirculation stream 172 is provided on bubble-cap column 168. A trim heater 174 and a pump 176 are provided for heat and circulation of this stream 172. This recirculation prevents water from exiting the bottom of column 168.

Vacuum is applied to the top of bubble cap column 168 by a liquid ring vacuum pump 180. Water and oxygen which exit overhead of the bubble-cap column 168 are conveyed to a phase separator 178 through vacuum pump 180. The vacuum pump 180 is sealed with water through stream 183 condensed in the bottom section of the phase separator 178. The sealant water 183 is pumped to the vacuum pump 180 by pump 179 through heat exchanger 181 cooling the stream 183. Cooling water flow 171 is provided to exchanger 181 for the cooling.

Entrained oil which is not utilized as sealant to the pumps is conveyed to the stream of unfinished oil 102 entering station 10, by means of stream 184. A level control 186 is provided at the bottom of bubble-cap column 168 and a valve 188 on stream 170 opens and closes responsive to the level control 186. Pump 157 motivates the flow. Stream 184 is driven by a product transfer pump 185 along with four valves 187, 189, 191 and 193 which allow the pump 185 to flow the unfinished oil or fat in the direction of the incoming stream 102 or the next station 12. This arrangement is used in start-up for establishing the initial temperature of the respective isothermal stations by flowing to the left. The arrangement of the pump 185 and valves 187, 189, 191 and 193 on conduit 184 and conduits similar to conduit 184 in other isothermal stations also have the purpose of evacuating the isothermal station when flowing to the next station. By stopping flow through metering pump 104 and refluxing the contained oil or fat within the isothermal station by flowing stream 184 to stream 102, the oil in each station may be refined to the degree to which that respective station is capable. Once the entire containment of the isothermal station is thusly refined or deodorized, flow to the next station evacuating the present station is accomplished by the various transfer pumps such as pump 144 and pump 185 on stream 184. Hence, the disclosed apparatus and system are capable of refining and deodorizing to completion all of the oil or fat contained in each individual station as well as continuously through all stations.

Likewise, it is unnecessary to evacuate the entire five isothermal stations to change an oil or fat product. By evacuating one station and allowing its chambers and piping to drain, the containment therefrom is evacuated forward into subsequent processing of the first oil or fat. While the evacuation process proceeds, partial reflux takes place through streams such as stream 184. The second oil or fat is introduced into the now evacuated isothermal station. With this sequence, the second oil or fat is continued throughout the entire apparatus while it still enjoys most of the heat transferred from the leaving first oil or fat.

Referring still to FIGS. 2A-2F, the unfinished oil which has been deaerated and dehydrated in chambers 51-56 enters heat exchanger 30. Heat exchanger 30 exchanges heat from a finished oil stream 190 entering the heat exchanger 30 at approximately 230° F. Any vapors released by the increase in temperature from the oil or fat are carried in stream 194 which is provided at the top of exchanger 30 allowing the vapors to exit exchanger 30. Stream 194 flows vapors to stream 110 and both are connected to vertical stream 196.

Stream 192, at approximately 230° F., enters a mixer 200 where dried and deaerated clay are mixed with the oil for bleaching. A heat exchanger 202 on stream 192 is provided for trim heating. Stream 192 then enters a first set of pressure filters 204 which are provided in parallel on this stream to remove the clay, chlorophyll, and color chemicals from the stream. A level controlled tank 206 is disposed on stream 192 prior to filters 204 and is connected to a valve 208 downstream of filters 204 to maintain the flow through filters 204 at the rate oil is supplied to filters 204. The unfinished oil from filters 204 then enters a second level control tank 210 and a second set of pressure filters 212 disposed in parallel. The second set of filters are polishing filters which further remove the clay and color chemicals. The pressure filters and the devices for adding deaerated clay are well known in the bleaching art. Recycle, if necessary or desired in the bleaching isothermal station can be provided in stream 216.

Unfinished oil in stream 214 from the second set of filters 212 enters a heat exchanger 32 for again exchanging heat with finished oil. Unfinished oil enters heat exchanger 32 in a stream 214 at approximately 230° F. and exits heat exchanger 32 in stream 302 at approximately 285° F. The finished oil enters heat exchanger 32 via stream 304 at approximately 295° F. and exits via stream 190 at approximately 240° F. Vapor from the unfinished oil stream which enters heat exchanger 32 can exit the heat exchanger in a stream 306. Liquid in stream 302 enters a contactor 308 to further allow vaporization and the vapor from this contactor enters stream 306.

The stream of unfinished liquid oil 302 is conveyed through distillation chambers 61-64 connected in the same manner as distillation chambers 53-56. At this isothermal station, distillation chambers 61-64 remove all components more volatile than tocopherol. These components are essentially alcohols, aldehydes and ketones. Liquid ring pumps 310, 312, 314 and 316 provide suction to the top of chambers 61-64. Entrained oil, sealant oil and vapors are conveyed to bubble cap column 318 by liquid ring pump 320 for separating and recycling the entrained oil and supplying unfinished oil for sealant to the liquid ring pumps. Liquid ring pump 324 conveys overhead vapors of aldehydes, alcohols, etc. to a phase separator 322. The liquid ring pump 324 uses a special sealant suitable for high temperature which is collected at bottom of phase separator 322 and pumped by pump 323 through exchanger 325 where it is cooled by cooling water 171.

The underflow unfinished oil from the distillation chambers 61-64 is conveyed via stream 326 to heat exchanger 36. This again provides heat exchange between the unfinished oil and finished oil. The unfinished oil enters at approximately 285° F. and exits in stream 402 at approximately 300° F. or a temperature which will produce a 290° F. temperature at the top of rectifying column 412. Tocopherol will vaporize at this temperature.

Following heat exchange in heat exchanger 36, the unfinished oil is conveyed to distillation chambers 71-74 for removal of tocopherol. The distillation chambers 71-74 are of the same type and have the same apparatus configurations as the distillation chambers 53-56 and 61-64. Liquid ring pumps 404, 406, 408 and 410 are connected on their suction side to each respective distillation chamber. The liquid ring pumps are sealed with entrained oil separated in a rectifying column 412 from the overhead from distillation chambers 71-74. A rectifying column 412 with many trays is used in order to separate relatively pure tocopherol from free fatty acids. The lower four trays of the rectifying column are used for entrained oil separation.

A reflux circulator and heater 414 is provided on the side of rectifier 412 to heat the oil for rectifying and to continuously recirculate oil from the bottom of the rectifying column 414 to the fifth tray of the column. This ensures that all rising vapors entering the rectifying column encounter downwardly flowing heated oil.

A second reflux circulator and heater 416 extends between the sixth and eighth trays of the rectifying column 412 again heating and recirculating free fatty acids from a lower portion of the rectifying column 412 to a higher portion. A product recovery tank 418, is attached to the sixth tray to recover lower boiling temperature free fatty acids which will rise in the rectifying column to this tray. A vapor connection 420 extends from the product recovery tank 418 to the rectifying column 412 to equalize pressure in the 448 as liquid enters and leaves the tank responsive to a level control in the tank.

A level control 422 is disposed in the bottom of rectifier 412 to control the level of oil which is retained in the rectifier 412. A pump 424 pumps the excess oil back to stream 322, entering heat exchanger 36 by way of stream 426. The flow through stream 426 is controlled by a valve 428, responsive to the level control 422.

Pump 424 also pumps oil to liquid ring pumps 404, 406, 408, 410 and 411 as sealant. The sealant oil is cooled prior to entering the pump by a cooler 430. Constant flow valves just prior to each pump control the flow of sealant to the pumps.

A liquid ring pump 432 provides suction to the top of rectifier 412 and is sealed by tocopherol product from a surface condenser 434. By using pure tocopherol as sealant to the pump 432 the overhead vapors from the rectifier 412 are not contaminated. The outlet of the liquid ring pump 432 supplies essentially pure tocopherol to the surface condenser 182.

The tocopherol vapors from rectifier 412 are conveyed to surface condenser 434 through stream 438.

The tocopherol stream 438 enters the top of surface condenser 434 and moves over the coils of the surface condenser fed by the cooling water stream 171. The flow of tocopherol in stream 438 is very slow and yet it is desirable to have turbulent flow of vapors over the coils to improve heat transfer. Accordingly, magnetically driven vapor recirculation blowers 440 recycle vapors from the bottom of condenser 434 to the top of condenser 434 at a rate sufficient to provide turbulent vapor flow over the coils. The blowers are magnetically driven to prevent any air contamination of the tocopherol due to failing blower seals.

Referring also to FIG. 15, it can be seen that the bottom of the surface condenser 434 is divided into two areas or chambers 442 and 444 by a plate 446 which slightly slopes to the center across the bottom of condenser 434. The two chambers plus the adjustable cup liquid seal between them, provide a controlled pressure differential favoring the upper chamber with higher pressure to aid the vapor reflux flow by the blowers. The very small amounts of tocopherol vapor conveyed to and exiting from pump 436 form a vapor stream 437, are mixed with vapors unable to be condensed in the next isothermal station and are gathered in a tank 439. Liquid from tank 439 is pumped through a chiller 441 and returned as sealant to pump 436 by a stream 443.

A pipe 448 extends down from the center of plate 446 into a cup 450 which is filled with tocopherol liquid condensed from the upper chamber 442. As more tocopherol condenses the liquid overflows the cup and falls into lower chamber. The liquid in cup 450 extends about the lower end of pipe 448 to seal the upper chamber 442 from the lower chamber 444. The pressure differential between chamber 442 and chamber 444 is the liquid height in the cylinder 448.

The cup 450 is supported by a threaded central rod 452 which is fixed to spiders 454 and 456 in cylinder 448. By threaded movement of the cup 450 on the rod 452 the height of liquid in cylinder 448 can be adjusted which, in turn, adjusts the pressure differential between chambers 442 and 444.

Liquid tocopherol gathers in the lower chamber 444 of the condenser 434 and the level of this liquid is controlled by a level control 458. A pump 460 is provided to draw the tocopherol from this liquid in condenser 434 by way of stream 462. A valve 464, responsive to the level control 460, controls flow in stream 462. Pump 460 also supplies tocopherol sealant to liquid ring pump 432 through stream 466.

As can be seen, six different effects of vacuum energy are applied to provide a vaporization of and separation of tocopherol from unfinished oil. The first effect is the counter velocities between the liquid surfaces of the driven sheets of oil or fat and the vapor velocities leaving overhead each distillation chamber. The second effect is the liquid ring pumps 406 through 410. The third effect is the liquid ring pump 411 connected to the outlet of pumps 406 through 410. The fourth effect is the liquid ring pump 432 providing suction to the rectifier 412. The fifth effect is the surface condenser 434 which provides suction due to condensation of the tocopherol vapors. And, finally, the sixth effect is the liquid ring vacuum pump 436 which provides suction to the surface condenser 434. By means of the staged vacuum sources, an increased efficiency for each is achieved.

Referring now to FIG. 2E, the unfinished oil from the tocopherol distillation chambers 71 through 74 enters heat exchanger 40 via stream 468 at approximately 300° F. and exits via stream 502 at approximately 480° F. Finished oil at approximately 490° enters the heat exchanger 40 via stream 504 and exits via stream 470 at approximately 310° F.

As with the previously described isothermal stations, the fatty acid distillation station flows the unfinished oil through distillation chambers producing a vapor (mainly free fatty acids but also including some entrained triglycerides) and a liquid unfinished oil. This station also includes a similar six effect vacuum system for supplying the vacuum for distillation. The configuration of the pumps, distillers, and surface condenser are essentially the same as described in the separation system for tocopherol. In place of the rectifier 412 is a fractionator 510. This allows separation of free fatty acids having different boiling temperatures and provides for discrete product separation and removal. Separate free fatty acids taken from various trays of fractionator 510 exit in stream 512, 514, 516 and 518 as well as from the bottom of the surface condenser.

The unfinished oil from the distillation chambers 81 through 88 is conveyed at approximately 490° as underflow from the distillation chambers in stream 520. Citric or malic acid is added to the stream 520 by a mixer 522 to separate the peroxides and hydroperoxides at the double carbon bonds of the unsaturated oils or fats.

The underflow unfinished oil in stream 520 is then conveyed to the stripping steam station for removal of peroxides.

The distillation-stripping chambers 91 through 94 receive the unfinished oil from stream 520 in series and are essentially the same as the other distillation chambers described above except for the addition of a stripping steam distributor located at the bottom of the chambers. Stripping steam enters each distillation-stripping chamber at approximately 500° F. through a capillary distributor described in more detail below. The level of liquid in the distillation-stripping chamber is maintained higher in the chamber to allow the necessary percolation of steam through the oil in the chamber. The tops of the chambers still include nozzles for driving sheets of the unfinished oil as necessary for efficient distillation.

Liquid ring vacuum pumps provide vacuum to each of the distillation-stripping chambers 91 through 94. The pressure side of these pumps is connected to the suction of a liquid ring pump 602 which conveys the overhead flow from the distillation-stripping chambers 91 through 94 to a bubble-cap column 604 for removal of entrained oil. The entrained oil recovered in the fatty acid distillation station are conveyed back to stream 468 by stream 606. A liquid ring pump 608 provides vacuum to the bubble-cap column 604.

Peroxides and hydroperoxides and stripping steam are conveyed through vacuum pump 608 and into phase separator 610. The peroxides, hydroperoxides and the stripping steam are vented to the atmosphere through stream 44. A special high temperature sealant is returned to the liquid ring pump 608 by pump 611 after being cooled in exchanger 613.

Super-heated stripping steam is provided to the distillation-stripping chambers 91 through 94 by a boiler 620 and a super-heater 622. Boiler 620 supples saturated steam for the super-heater 622 as well as to various start-up and temperature trimming heat exchangers in various isothermal stations in the process. Super-heater 622 supplies high temperature super-heated steam for steam stripping and start-up and temperature trimming heat for the fatty acids isothermal station. Boiler 620 receives the non-condensibles from the low temperature refining, tocopherol and the fatty acid isothermal stations for complete oxidation by combustion in the furnace section of boiler 620.

Figure 3:
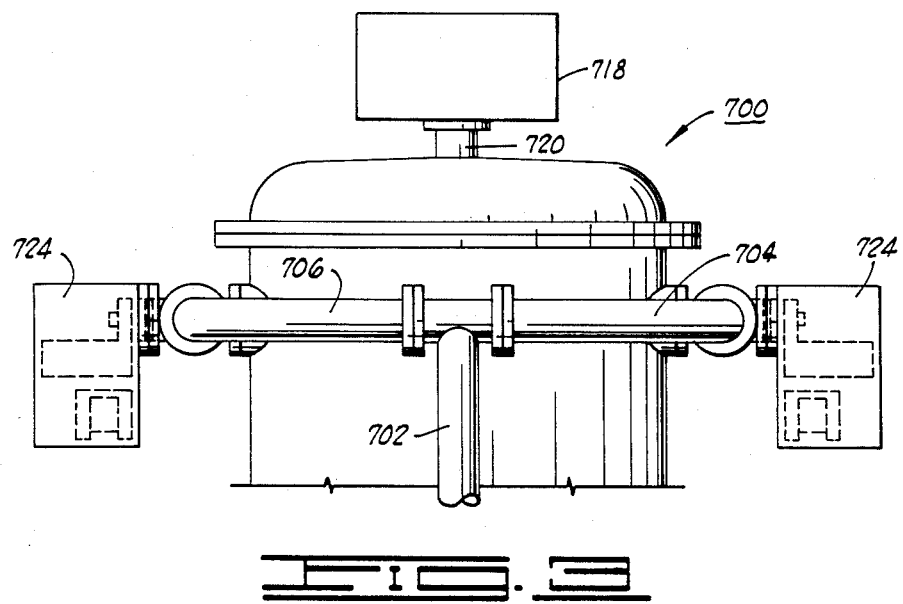
FIG. 3 is a partial side view of a distillation column constructed in accordance with the present invention.
Figure 4:
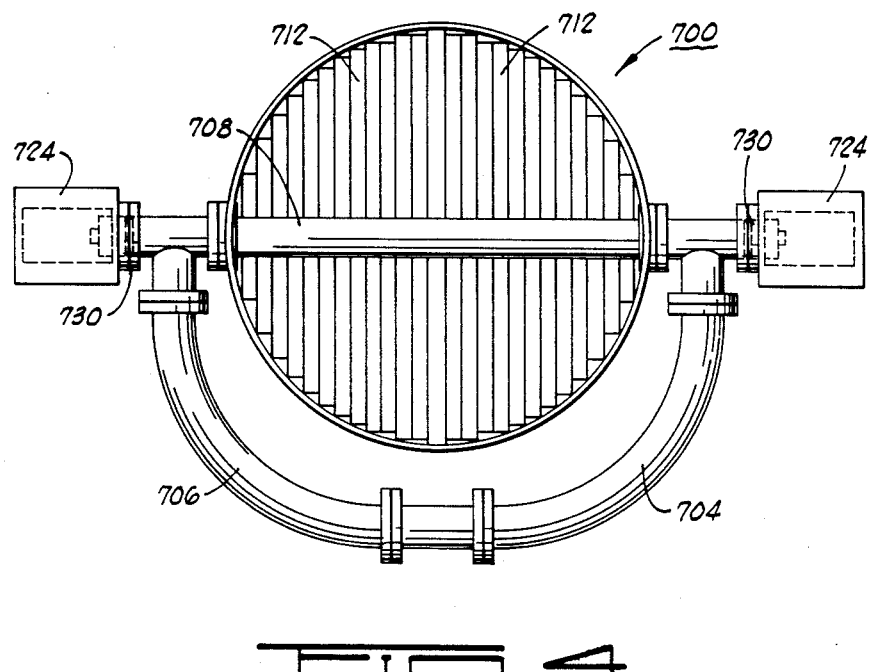
FIG. 4 is a plan view of the column of FIG. 3 with the top removed.
Figure 11:
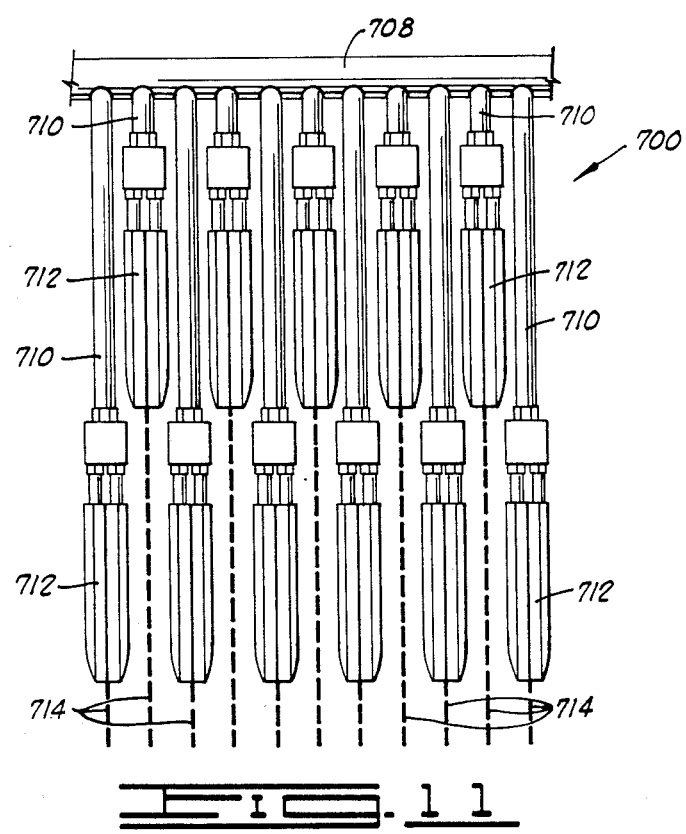
FIG. 11 is a schematic side view of a nozzle arrangement in a distillation column of the type shown in FIG. 2.

Referring now to FIGS. 3, 4 and 11, the top of a distillation chamber 700 (such as 51–56, 61–64, 71–74, 81–88 or 91–94) is shown. A typical distillation chamber 700 would have a height of approximately 3 meters and a diameter of approximately 0.7 meters. An incoming stream of oil enters the top of the distillation chamber 700 through a riser conduit 702. The riser conduit 702 is connected to a pair of horizontal conduits 704 and 706 which split the stream for entering on opposite sides of the distillation chamber 700. As the oil stream enters the opposite sides of the distillation chamber 700, it enters a manifold 708 which spans the diameter of distillation chamber 700 from the conduit 704 to the conduit 706. Extending downwardly from manifold 708 is a plurality of supply tubes 712 which enter each of the top central portions of each of the nozzles 712.

The nozzles 712 are disposed parallel to each other and are all normal to the manifold 708. Each nozzle is staggered in its height with respect to its adjacent nozzle so as to allow closer packing of the nozzles as well as to allow unrestricted flow of the vapors to the primary liquid ring vacuum pump. Of course, the sheets of oil 714 driven by the nozzle must not contact the adjacent nozzles. The ends of each nozzle 712 are held by a clamp or ring 716. In this manner, the nozzles are held fixed for uniform and constant driving of the oil sheets 714. A typical speed for a sheet of oil from each nozzle would be approximately from 1 to 50 meters/sec.

A liquid ring vacuum pump 718 is connected to a conduit 720 which is disposed in the upper center of a cap 722 of distillation chamber 700. As the vacuum pump 718 provides vacuum to the distillation chamber 700, the source of vacuum is, therefore, directly above the nozzles 712 which drive the sheets of oil 714 downwardly in the distillation chamber 700. A typical vacuum pressure at the vacuum pump 718 may be as high as 25 mm Hz.

A pair of microwave exciters 724 are attached to conduits 704 and 706 adjacent to the entrances to distillation chamber 700. These microwave exciters face each other through manifold 708. Conduits 704 and 706 open to the microwave exciters 724 through plates 730 which are transparent to microwaves but, of course, prevent the oil from entering the microwave devices 724.

Referring to FIGS. 5 through 10, a nozzle 800 (such as 712 in FIGS. 4 and 11) is shown in more detail. Each of the nozzles 800 has a pair of mated halves 802 and 804. Nozzle halves 802 and 804 are joined at their upper midportion by threaded bolts 806 and on their ends by threaded bolts 808. A spacer 810 separates the two halves 802 and 804 and, in part, determines the thickness of a sheet of oil extruded from the nozzle 800.

Each of the nozzle halves 802 and 804 has a central tube 812 and 814, respectively, extending from a central cavity through the midportion of the top of the nozzle half. The tubes 812 and 814 are joined to a single tube 816 which, in turn, joins the manifold in the top of the column (such as manifold 708 in FIG. 4). Thus, liquids moving from the manifold to the tube 816, the tubes 812 and 814 and finally, an opening or chamber 820 at the center of nozzle 800. From chamber 820, the liquid must pass through additional chambers 822, 824, and 826 before exiting the nozzle 800 at the opening slit 828. Each of the chambers 820, 822, 824 and 826 are defined by mated grooves on the adjoining surfaces of nozzle halves 802 and 804.

Each of the chambers 820 through 824 is connected to its adjacent chamber so as to promote uniform pressure and distribution of liquid flow longitudinally in the nozzle. First, the chamber 820 is connected to chamber 822 by an inclined opening 830. By inclined is meant that the opening is wider at the edges of the nozzle halves 802 and 804 than at the midportion of these halves with a constant taper therebetween. This helps to equalize the distribution of pressure and flow after the liquid enters the midportion of the nozzle 800 through tubes 814 and 816.

Chamber 822 is connected to chamber 824 by a slotted opening 832. A plurality of grooves or slots 834 extend vertically in the nozzle along the opening 832 to further equalize the pressure and flow of liquid longitudinally across the nozzle 800.

Chamber 824 is connected to chamber 826 by a uniform flat opening 836. This uniform opening evens the pressure differentials created by the slots 834.

The opening slit 828 allows liquid from chamber 826 to exit the nozzle 800. The width of this opening slit 828 can be precisely controlled by adjustment screws 840 provided at uniform distances across the upper edge of the nozzle 800. These adjustment screws 840 act to press apart the upper surfaces of the halves 802 and 804 narrowing the opening of 828 as the halves are moved apart. The pressure of the liquid as it moves through opening 828 acts to resiliently increase the size of opening 828 and act against screws 840. A constant pressure valve 842 controls the pressure of the oil supplied to each group of nozzles so as to maintain uniform pressure and, therefore, a relatively narrow, elongated uniform, oil sheet. The screws 840 are spaced longitudinally along the top of nozzle 800 to provide discrete longitudinal adjustment along the opening 828. The distance between each of the screws 840 can be changed to allow coarse or fine longitudinal adjustment.

In some instances, it is desirable to have a drag plate 846 (See FIG. 10C—plate 846 is not shown in FIG. 10A for clarity as to its design) to aid in maintaining integrity of the driven sheet from the nozzle 800. The purpose of the drag plate 846 is to exert a central, inner liquid drag force on liquid passing from the nozzle 800 reducing velocities at the central portion of the liquid sheet. This balances those forces on the surface of the liquid sheet which would tend to prematurely disrupt the sheet. The inner drag force balances the external drag force and the oil sheet driven from the nozzle maintains its integrity for a further distance from the nozzle.

The drag plate 846 has an elongated uniform cross section and a flat plate portion 850 extends from chamber 822 through chamber 826. Liquid passes evenly on each side of the plate as a result of liquid pressure. A triangular head portion 849 of drag plate 846 resides within chamber 822 and rests upon the inclined upper shoulders at slotted opening 832. This retains the drag plate 846 in place. The tip 852 of drag plate 846 extends to or beyond the nozzle lips at opening 828.

In preparing a nozzle for use in a column the nozzle is first fitted with a spacer 810 which partially determines the thickness of the sheet of oil which will be formed by the nozzle. Next, the nozzle is placed on a test bench for flowing of oil through the nozzle and fine tuning of the driven sheets produced by the nozzle. Adjustment of the oil pressure (by valve 842) and the screws 840 optimizes the thickness durability and uniformity of the driven sheet. This is crucial to allow the sheet to remain intact for sufficient depth in the column while being driven at high speeds. The nozzles are fitted one by one into the column and fine tuned in place.

Preferably, the nozzle halves 802 and 804 are formed of stainless steel which has been subjected to milling for the chambers and the inclination of opening 830 and the slots 834. However, for low temperature chambers and for a less expensive nozzle, the nozzle halves can be made of extruded aluminum and subjected to less milling. The nozzle lips at opening 828 can be covered with a nonwetting surface 844 of tetraflouroethylene or the like to further improve the quality of the driven sheet.

Figure 13:
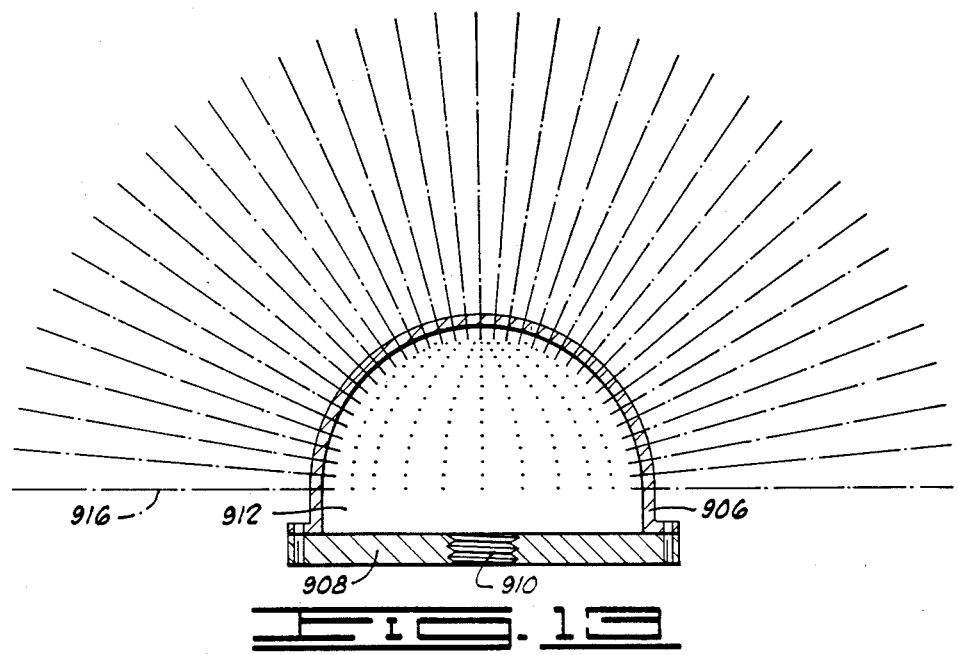
FIG. 13 is a cross-sectional view of a steam distributor of the steam stripping column of FIG. 12.
Figure 18:
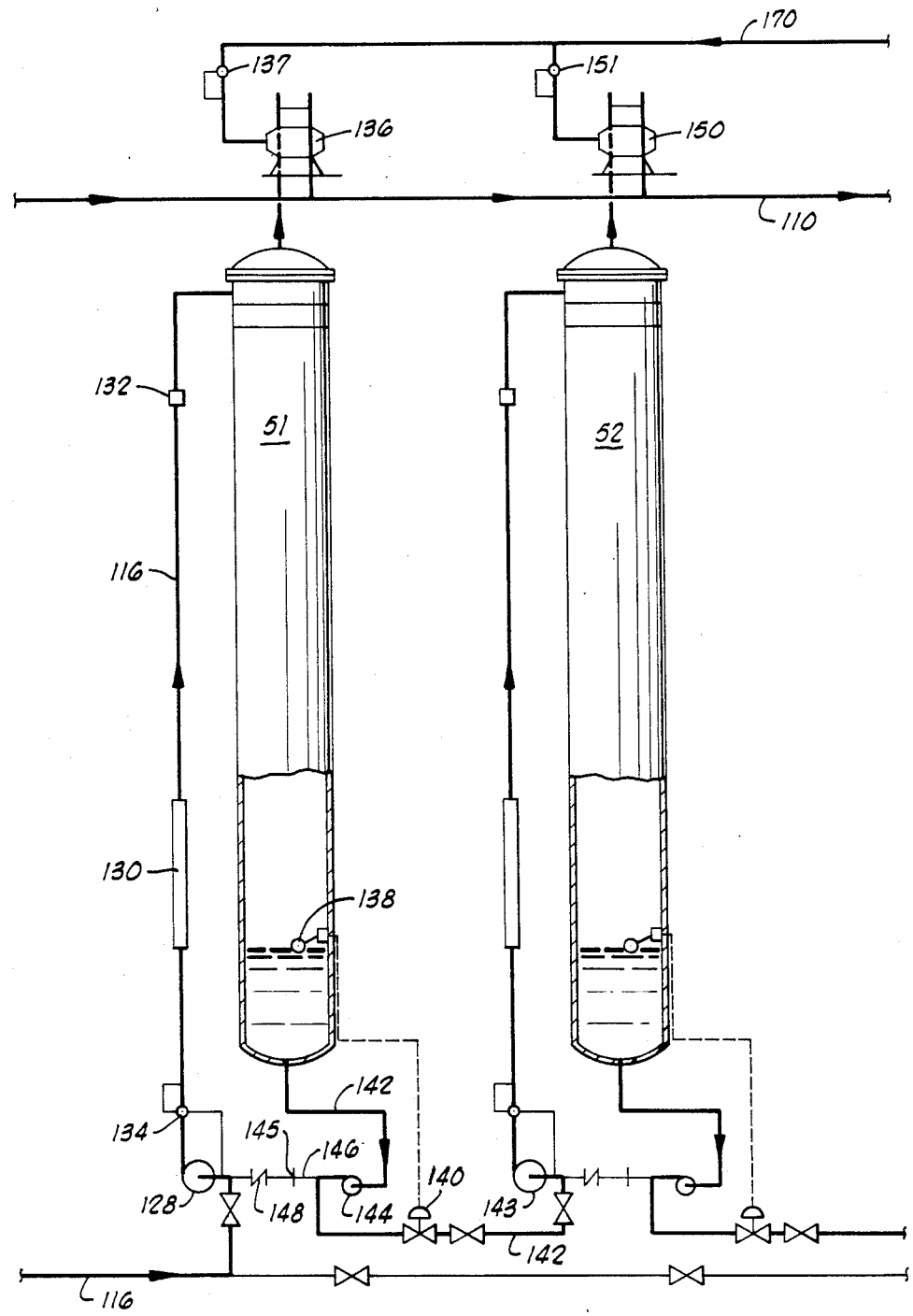

Referring now to FIGS. 12 through 14, a distillation-stripping chamber 900 is shown. Of special importance to distillation-stripping chamber 900 is the method and device for distributing steam beneath the liquid surface 902. A sparging nozzle assembly 904 disposed in the bottom of column 900 is shown in more detail in FIG. 13 and a tube portion of the nozzle assembly 904 is shown in more detail in FIG. 14.

The sparging nozzle assembly 904 includes a hemispherical chamber body 906 closed at its lower end by a plate 908. A threaded opening 910 is provided in the center of plate 908 to allow super-heated steam to enter the chamber 912 formed by the hemispherical body 906 and plate 908 through an attached pipe 914.

Extending through the hemispherical body 906 is a plurality of small tubes 916. Steam which enters the chamber 912 passes through the tubes 916 prior to entering the liquid in distillation-stripping chamber 900. The size of the holes in tubes 916 determines the size of bubbles formed in the liquid as steam moves into the liquid through the tubes.

Preferably, the size of the hole 918 in tubes 916 is of capillary size so that as fluid flows through the tubes the flow rate is mainly determined by the size of the hole 918 and the length of the tube 916. In other words, fluid or gas can not flow significantly faster than an optimum, rate because of the restriction of the tube size. A typical hole 918 would have a diameter of approximately 0.025 to 0.25 millimeters. This flow rate uniformity produces a uniform bubble size which allows the optimum surface area to mass ratio of the super-heated steam bubbles. Also, the capillary hole size 918 and the length of tube 916 prevent bubble explosion in the liquid since the super-heated steam enters the liquid near the static pressure of the liquid. This is important since bubble explosion makes a small bubble size impossible.

The tips 920 of the tubes 916 are tapered and sharpened to a cone to reduce contact of the formed bubbles with the tips 916. This prevents erratic bubble growth which can occur when there is a large metal surface at the location of bubble initiation. Again, this creates a small and uniform bubble size.

Super-heated steam is conveyed to the chamber body assemby 904 by a pipe 914 threaded to the opening 916. The pipe 914 and its connected chamber body assembly 904 are cantilevered in the lower end of distillation-stripping chamber 900. A vibrator 922 is mounted on the pipe 914 to constantly vibrate the chamber body assembly 904 and the tubes 916. Preferably, the vibrator 922 vibrates the tubes 916 up to 60 kilohertz so as to decrease the bubble size produced by the tubes 916 and to make the bubble size small and uniform among the tubes.

The flow through an individual capillary tube is determined by three functions provided there is sufficient static pressure on the fluid to exceed the velocity friction losses. They are the capillary size, the tube length and the fluid viscoscity. These determinates will provide an upper limit to the individual tube flow regardless of how much pressure is applied to the fluid as long as it is above the velocity friction losses. Hence, when the design of a singular tube has been made and the fluid is selected (including temperature), its flow is also determined. The total or composite flow through as assembly such as sparging nozzle assembly 904, is the individual tube flow times the number of tubes in the assembly. Once an assembly flow is determined, the uniformity of the composite flow may be monitored with an extremely accurate flow measurement (even slight differential pressure changes across an orifice plate placed in the total flow) to determine if tube clogging or tube wash-out has occurred. With such an arrangement, the present invention safeguards itself from malfunctions.

Preferably a warning device 932 is provided on conduit 926 to indicate plugging of the tubes 916 or wash-out of the tubes 916.

The tubes 916 can be constructed of stainless steel and may be clad with a brazing material if desired.

The devices and methods described above have been described for the continuous refining and deodorizing as would be typical for salad oil. If desired, continuous hydrogenation could be added to this system for other oils. Continuous processes for the hydrogenation of edible fats and oils are part of the present state of the art and these processes are completely compatible with the present invention. The inclusion of hydrogenizing processes would be placed up-stream of the final isothermal station. Continuous hydrogenation processes and equipment are shown in U.S. Pat. No. 2,520,422; 2,520,423; 2,520,424; 3,792,067; and 3,634,471.

In the system described above, blended oil and fats are mixed in the unfinished stage in their proper ratios and are fully processed in the combined state. This is a departure with most of the present practices which process the oils and then blend.

One aspect of the present state of the art not compatible with the present invention is heat bleaching. This process calls for a long residence at a high temperature which is contrary to the present invention's objectives. As degradation of the refined and deodorized oil or fat is a function of time as well as high temperature, the present disclosure provides new control with extremely short retention time during the final isothermal station which produces a superior purity of oil and fat while, at the same time, eliminates degradation associated with all other processes.

The present industry practice is to produce the lowest absolute pressure at all costs which, unfortunately, ignores the dynamics of the vapor flow in relation with the fluid film establishment. Measurements of a few millimeters of mercury vacuum are possible at the primary vacuum device (not at one millimeter above a distilling surface of oil or fat) with the present state of the art.

However, this has little to do with the rate of distillation since the vacuum at the liquid surfaces where distillation occurs is much higher. The present invention does not attempt to produce a vacuum (measured statically) near this level as it finds that such is unnecessary.

As can be seen by the above description, the methods and apparatus of the present invention are well adapted to achieve the objects and advantages mentioned as well as those inherent therein. While presently preferred embodiments of present invention have been described for the purpose of this disclosure, numerous changes in the construction and arrangement parts and the method can be made by those skilled in the art, which changes are encompassed within the spirit of this invention is defined by the appended claims.

What is claimed is:

1. A method of distilling a distillation product from raw edible oil, comprising the steps of:
   forming from a relatively narrow, elongated nozzle a sheet of liquid edible oil having a relatively narrow thickness and a relatively large surface area;
   downwardly driving at from approximately 1 to 50 meters per second said sheet of liquid edible oil in a distillation column at distillation temperature and pressure such that a distillation vapor product is formed therefrom, said downward driving of said sheet resulting from a relatively high pressure drop of said liquid edible oil as it passes from said nozzle in said forming of said sheet;
   forming a relatively low pressure at the top of said distillation column directly above and in line with said nozzle such that said vapor product is driven rapidly upwardly and such that the surface of said downwardly driven sheet of oil moves rapidly with respect to vapor in said distillation column to promote distillation; and
   removing said vapor product from the top of said distilation column above said nozzle.

2. The method of claim 1 wherein said distillation product comprises a distillation product selected from the group consisting of:
   water, air tocopherol and fatty acids.

3. The method of claim 2 wherein said distillation product comprises fatty acids.

4. The method of claim 1 which further comprises a step of:
   directing microwave radiation to said liquid edible oil immediately prior to said step of forming a sheet of liquid edible oil.

5. A continuous process of deodorizing and refining an edible oil containing tocopherol and free fatty acids comprising:
   (a) continuously supplying edible oil to a first vacuum distiller and flowing said edible oil in sheets driven downwardly within said first distiller at from approximately 1 to 50 meters per second distilling tocopherol vapor from said edible oil and removing said tocopherol vapor from the top of said first distiller such that said tocopherol vapor moves rapidly upwardly across said driven sheets of edible oil to promote distillation; and
   (b) continuously supplying, concurrent with step (a), edible oil from which tocopherol has been distilled in said first vacuum distiller to a second vacuum distiller and flowing said edible oil in sheets driven downwardly within said second distiller at from approximately 1 to 50 meters per second, distilling fatty acid vapors from said edible oil and removing said fatty acid vapors from the top of said second distiller such that said fatty acid vapors move rapidly upwardly across said driven sheets of edible oil to promote distllation.

6. The process of claim 5 wherein said edible oil also contains air and water and which further comprises the step of:
   (c) continuously supplying, concurrent with steps (a) and (b), edible oil to a third vacuum distiller and flowing said edible oil in driven sheets within said third distiller dehydrating and deaerating said edible oil for supply to said first vacuum distiller; and wherein said edible oil supplied to step (a) is dehydrated and deaerated in step (c).

7. The process of claim 6 wherein said edible oil also contains peroxides and hydroperoxides which further comprises the step of:
   (d) continuously supplying, concurrent with steps (a), (b) and (c), edible oil from which fatty acids have been removed, to a steam stripper steam stripping peroxides and hydroperoxides from said edible oil.

8. The process of claim 7 wherein said edible oil also contains lecithins and which further comprises the step of:
   (e) continuously supplying, concurrent with steps (a), (b), (c) and (d), edible oil to a fourth distiller and flowing said edible oil in downwardly driven sheets within said fourth distiller degumming said edible oil for supply to said first vacuum distiller; and wherein said edible oil supplied to step (a) is degummed in step (e).

9. The process of claim 8 wherein said edible oil also contains chlorophyll and which further comprises the step of:
   (f) continuously supplying, concurrent with steps (a), (b), (c), (d) and (e), edible oil to a bleaching device bleaching said edible oil for supply to step (a); and wherein said edible oil supplied to step (a) is bleached in step (f).

10. The process of claim 9 wherein said edible oil contains hydrocarbons more volatile than tocopherol and which further comprises the step of:
    (g) continuously supplying, concurrent with steps (a), (b), (c), (d), (e) and (f), edible oil from steps (c), (e) and (f) to a fifth distiller and flowing said edible oil in driven sheets within said fifth distiller distilling said hydrocarbons more volatile than tocopherol from said edible oil; and
    wherein said edible oil supplied to step (a) is distilled in step (g).

11. The process of claim 5 which further comprises the step of:
    (c) continuously condensing said distilled tocopherol in a chamber having a vapor chamber and a separated liquid chamber, said vapor chamber having condensing surfaces therein; including continuously recirculating tocopherol vapor through said vapor chamber so to provide turbulent flow of said vapor across said condensing surfaces.

* * * * *

UNITED STATES PATENT AND TRADEMARK OFFICE
CERTIFICATE OF CORRECTION

PATENT NO. : 4,613,410

DATED : September 23, 1986

INVENTOR(S) : Jacob Boyd Rivers, Jr.

It is certified that error appears in the above-identified patent and that said Letters Patent are hereby corrected as shown below:

Column 6, line 20, the word "staall" should be changed to ---station all--; Column 7, line 67, the words "Fig. 17" should begin a new paragraph; Column 9, line 63, the word "above" should be changed to --adjacent to--; and Column 11, line 51, the little symbol between the numbers "61" and "64" should be a hyphen.

Signed and Sealed this

Seventeenth Day of March, 1987

Attest:

DONALD J. QUIGG

*Attesting Officer*    *Commissioner of Patents and Trademarks*